(12) United States Patent
Wu et al.

(10) Patent No.: US 12,367,007 B2
(45) Date of Patent: Jul. 22, 2025

(54) FIRST ELECTRONIC DEVICE, SECOND ELECTRONIC DEVICE, AND PROJECTION PROCESSING METHOD

(71) Applicant: Huawei Technologies Co., Ltd., Shenzhen (CN)

(72) Inventors: Haoran Wu, Wuhan (CN); Zhipeng Wu, Wuhan (CN); Feng Liu, Wuhan (CN); Shiyao Hu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/686,308

(22) PCT Filed: Aug. 9, 2022

(86) PCT No.: PCT/CN2022/111037
§ 371 (c)(1),
(2) Date: Feb. 23, 2024

(87) PCT Pub. No.: WO2023/024889
PCT Pub. Date: Mar. 2, 2023

(65) Prior Publication Data
US 2024/0354047 A1 Oct. 24, 2024

(30) Foreign Application Priority Data
Aug. 25, 2021 (CN) ......................... 202110983630.5

(51) Int. Cl.
*G06F 3/14* (2006.01)

(52) U.S. Cl.
CPC .................................. *G06F 3/1454* (2013.01)

(58) Field of Classification Search
CPC .... G06F 3/1454; G09G 5/12; G09G 2354/00; G09G 2370/16; H04L 67/01; H04L 67/565; H04L 69/18; H04L 69/24; H04N 21/25825
See application file for complete search history.

(56) References Cited

U.S. PATENT DOCUMENTS

| 9,998,901 B2 * | 6/2018 | Qi ......................... H04W 8/005 |
| 2017/0359618 A1 * | 12/2017 | Chen ................. H04N 21/4312 |
| 2022/0272399 A1 | 8/2022 | Zhang et al. |
| 2024/0192912 A1 * | 6/2024 | Wang .................... G06F 3/1454 |

FOREIGN PATENT DOCUMENTS

| CN | 112351322 A | 2/2021 | |
| EP | 4064029 A1 * | 9/2022 | ........... G06F 3/0482 |

* cited by examiner

*Primary Examiner* — Xuemei Zheng
(74) *Attorney, Agent, or Firm* — Slater Matsil, LLP

(57) ABSTRACT

Some embodiments include a first electronic device that automatically sends a first search request and a second search request. The first search request is used in a search for an electronic device having a first projection receiving capability related to a first projection protocol, and the second search request is used in a search for an electronic device having a second projection receiving capability related to a second projection protocol. In some embodiments the first electronic device receives a first feedback message or a second feedback message, or any combination thereof, from a second electronic device, and the first electronic device automatically displays, in response to the first feedback message, the second feedback message, the first identity related to the second electronic device.

20 Claims, 20 Drawing Sheets

CONT.
FROM

| | | | |
|---|---|---|---|
| TLV (type) | 1 | 0x02 (device ID) | Device identity |
| TLV (length) | 1 | 0x20 | Length of the subsequent value |
| TLV (value) | Length-specified length | UDID | Specific content of the device identity |
| TLV (type) | 1 | 0x30 (Product ID) | First type identity |
| TLV (length) | 1 | 0x01 | Length of the subsequent value |
| TLV (value) | Length-specified length | | Value of a device type: 0x01-integrated projection device type 0x02-other device types |

FIG. 4

FIRST ELECTRONIC DEVICE, SECOND ELECTRONIC DEVICE, AND PROJECTION PROCESSING METHOD

CROSS-REFERENCE TO RELATED APPLICATIONS

This application is a National Stage of International Application No. PCT/CN2022/111037, filed on Aug. 9, 2022, which claims priority to Chinese Patent Application No. 202110983630.5, filed on Aug. 25, 2021. Both of the aforementioned applications are hereby incorporated by reference in their entireties.

TECHNICAL FIELD

Embodiments of this application relate to the field of computer technologies, and specifically, to a first electronic device, a second electronic device, and a projection processing method.

BACKGROUND

With development of computer technologies, projection or casting between a plurality of devices becomes increasingly common. Currently, a mainstream projection solution is implemented by digital living network alliance (digital living network alliance, DLNA)-based projection and mirror projection (miracast).

DLNA-based projection needs to depend on a router and an external network. In addition, a projection button on a video play interface of a projection device is tapped to start searching until a receiving device is found, and then a display icon or the like of the found receiving device is tapped, to complete DLNA-based projection. In addition, mirror projection is to first record content played on a video play interface of a projection device, and then transmit a recorded data frame to a compatible receiving device for playing, to achieve projection or casting.

However, if the projection device and the receiving device do not belong to a same local area network, or do not support a DLNA-based projection function, or the like, DLNA-based projection fails. If a user expects to continue to complete projection or casting through mirror projection after DLNA-based projection fails, the user needs to manually enable a mirror projection function at a system port, to re-trigger searching to discover a receiving device, which is cumbersome, time-consuming, and the like. In addition, even if a DLNA-based projection capability and a mirror projection capability are integrated into a same projection port, two projection icons are still displayed on the projection device. As a result, the user is confused about the two displayed projection icons, and cannot accurately select a proper receiving device to complete projection or casting.

SUMMARY

Embodiments of this application provide a first electronic device, a second electronic device, and a projection processing method, to present a first identity related to the second electronic device to a user, reduce a process in which the user switches a projection port to re-trigger searching for the second electronic device, reduce complexity of a user operation, and improve ease of use of projection.

According to a first aspect, this application provides a first electronic device. The first electronic device may be a projection device or the like used in a projection scenario.

The first electronic device may include a processor, a memory, and a computer program. The memory is coupled to the processor, and the computer program is stored in the memory. When the computer program is executed by the processor, the first electronic device is enabled to perform the following operations: automatically sending a first search request and a second search request, where the first search request is used to search for an electronic device having a first projection receiving capability related to a first projection protocol, and the second search request is used to search for an electronic device having a second projection receiving capability related to a second projection protocol; then receiving a first feedback message and/or a second feedback message from a second electronic device, where the first feedback message is used to feed back that the second electronic device has the first projection receiving capability, and/or the second feedback message is used to feed back that the second electronic device has the second projection receiving capability; and automatically displaying, in response to the first feedback message and/or the second feedback message, a first identity related to the second electronic device.

In some implementations, when the first feedback message and the second feedback message are used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column.

In some implementations, when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column.

In some implementations, when the second feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column.

In the foregoing implementations, the first identity may include the device identity of the second electronic device, and at least one of the first control used to trigger projection to the second electronic device by using the first projection protocol and the second control used to trigger projection to the second electronic device by using the second projection protocol, and the device identity and the first control and/or the second control are displayed in a same row or a same column. In this way, the first identity related to the second electronic device is automatically displayed on a display interface of the first electronic device, so that a user can intuitively select, based on one device identity, a corresponding second electronic device for projection, without being confused about which device identity should be selected for projection. In addition, when one of the projection protocols cannot be used to complete projection, the other projection protocol may be directly used to complete projection, and there is no need to switch a projection port to search for a projectable device again. This reduces a process in which the user switches the projection port to re-trigger searching for the second electronic device, reduces complexity of a user operation, and improves ease of use of projection.

For example, in some implementations, that when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column includes: When the first feedback message is used to feed back that the second electronic device has the first projection receiving capability, and the second feedback message is used to feed back that the second electronic device does not have the second projection receiving capability, the first identity includes the device identity of the second electronic device and the first control used to trigger projection to the second electronic device by using the first projection protocol, and the device identity and the first control are displayed in a same row or a same column.

For example, in some implementations, that when the second feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column includes: When the first feedback message is used to feed back that the first electronic device does not have the first projection receiving capability, and the second feedback message is used to feed back that the second electronic device has the second projection receiving capability, the first identity includes the device identity of the second electronic device and the second control used to trigger projection to the second electronic device by using the second projection protocol, and the device identity and the second control are displayed in a same row or a same column.

For example, in some implementations, when the first feedback message is used to feed back that the second electronic device does not have the first projection receiving capability, and the second feedback message is used to feed back that the second electronic device does not have the second projection receiving capability, the first identity includes the device identity of the second electronic device.

For example, in some implementations, the first electronic device may receive, within preset duration, the first feedback message and/or the second feedback message from the second electronic device.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, the first capability field includes a first type identity and the device identity, the second capability field includes a second type identity and the device identity, and the first type identity and the second type identity identify a device type of the second electronic device.

For example, in some implementations, before automatically displaying the first identity related to the second electronic device, the first electronic device may further determine a third capability field after the second electronic device is determined as an integrated projection device based on the first type identity and/or the second type identity. The third capability field indicates that the second electronic device supports projection by using the first projection protocol and the second projection protocol. Then, the first electronic device determines a target capability list of the second electronic device based on the third capability field, the first capability field, and the second capability field, and generates the first identity. The first identity is related to the target capability list of the second electronic device.

For example, in some implementations, when performing the operation of determining the third capability field, the first electronic device may first determine a protocol priority capability field, where the protocol priority capability field includes a projection level of the first projection protocol and a projection level of the second projection protocol, and then determine the third capability field based on the first capability field, the second capability field, and the protocol priority capability field. In the foregoing implementations, in a scenario in which projection can be completed by using both the first projection protocol and the second projection protocol, projection is completed by using a projection protocol with a higher projection level, so that projection efficiency is greatly improved.

For example, in some implementations, that the first electronic device determines a target capability list of the second electronic device based on the third capability field, the first capability field, and the second capability field includes: determining a first capability list and/or a second capability list, where the first capability list includes the first capability field, and the second capability list includes the second capability field; and when the device identity in the first capability field is the same as the device identity in the second capability field, adding the second capability field and the third capability field to the first capability list, to obtain the target capability list of the second electronic device; or when the device identity in the first capability field is the same as the device identity in the second capability field, adding the first capability field and the third priority capability field to the second capability list, to obtain the target capability list of the second electronic device.

For example, in some implementations, the first electronic device further performs the following operations: obtaining a tapping instruction for the first identity, and sending projection indication information to the second electronic device in response to the tapping instruction. The projection indication information indicates the second electronic device to select to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a second aspect, this application provides another first electronic device. The first electronic device may be a projection device or the like. The first electronic device may include a processor, a memory, and a computer program. The memory is coupled to the processor, and the computer program is stored in the memory. When the computer program is executed by the processor, the first electronic device is enabled to perform the following operations: automatically sending a first search request, where the first search request is used to search for an electronic device having a first projection receiving capability related to a first projection protocol and an electronic device having a second projection receiving capability related to a second projection protocol; then receiving a first feedback message from a second electronic device, where the first feedback message is used to feed back that the second electronic device has the first projection receiving capability, and/or that the second electronic device has the second projection receiving capability; and automatically displaying, in response to the first feedback message, a first identity related to the second electronic device.

In some implementations, when the first feedback message is used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column.

In some implementations, when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column.

In some implementations, when the first feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column.

For example, in some implementations, that when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column includes: When the first feedback message is used to feed back that the second electronic device has the first projection receiving capability, and that the second electronic device does not have the second projection receiving capability, the first identity includes the device identity of the second electronic device and the first control used to trigger projection to the second electronic device by using the first projection protocol, and the device identity and the first control are displayed in a same row or a same column.

For example, in some implementations, that when the first feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column includes: When the first feedback message is used to feed back that the first electronic device does not have the first projection receiving capability, and that the second electronic device has the second projection receiving capability, the first identity includes the device identity of the second electronic device and the second control used to trigger projection to the second electronic device by using the second projection protocol, and the device identity and the second control are displayed in a same row or a same column.

For example, in some implementations, when the first feedback message is used to feed back that the second electronic device does not have the first projection receiving capability, and indicates that the second electronic device does not have the second projection receiving capability, the first identity includes the device identity of the second electronic device.

For example, in some implementations, the first electronic device may receive, within preset duration, the first feedback message from the second electronic device.

For example, in some implementations, the first feedback message includes a first capability field that is used by the second electronic device to support projection by using the first projection protocol, and a second feedback message includes a second capability field that is used by the second electronic device to support projection by using the second projection protocol.

For example, in some implementations, the first capability field includes a first type identity and the device identity, the second capability field includes a second type identity and the device identity, and the first type identity and the second type identity identify a device type of the second electronic device.

For example, in some implementations, before automatically displaying the first identity related to the second electronic device, the first electronic device may further determine a third capability field after the second electronic device is determined as an integrated projection device based on the first type identity and/or the second type identity. The third capability field indicates that the second electronic device supports projection by using the first projection protocol and the second projection protocol. Then, the first electronic device determines a target capability list of the second electronic device based on the third capability field, the first capability field, and the second capability field, and generates the first identity. The first identity is related to the target capability list of the second electronic device.

For example, in some implementations, the first electronic device may determine the third capability field in the following manner. That is, the first electronic device determines a protocol priority capability field, where the protocol priority capability field includes a projection level of the first projection protocol and a projection level of the second projection protocol. Then, the first electronic device determines the third capability field based on the first capability field, the second capability field, and the protocol priority capability field.

For example, in some implementations, that the first electronic device determines a target capability list of the second electronic device based on the third capability field, the first capability field, and the second capability field includes: determining a first capability list and/or a second capability list, where the first capability list includes the first capability field, and the second capability list includes the second capability field; and when the device identity in the first capability field is the same as the device identity in the second capability field, adding the second capability field and the third capability field to the first capability list, to obtain the target capability list of the second electronic device; or when a first device identity is the same as a second device identity, adding the first capability field and the third priority capability field to the second capability list, to obtain the target capability list of the second electronic device.

For example, in some implementations, the first electronic device further obtains a tapping instruction for the first identity. In addition, the first electronic device sends projection indication information to the second electronic device in response to the tapping instruction. The projection indication information indicates the second electronic device to select to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a third aspect, this application provides a second electronic device. The second electronic device may include but is not limited to a receiving device and the like used in a projection scenario. The second electronic device may include a processor, a memory, and a computer program. The memory is coupled to the processor, and the computer program is stored in the memory. When the computer program is executed by the processor, the second electronic device is enabled to perform the following operations: receiving a first search request and a second search request that are sent by a first electronic device, where the first search request is used to search for an electronic device having a first projection receiving capability related to a first projection protocol, and the second search request is used to search for an electronic device having a second projection receiving capability related to a second projection protocol; and sending a first feedback message and a second feedback message to the first electronic device, where the first feedback message is used to feed back that the second electronic device has the first projection receiving capability, and/or the second feedback message is used to feed back that the second electronic device has the second projection receiving capability.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, before sending the first feedback message and the second feedback message to the first electronic device, the second electronic device extends a first type identity and a device identity in the first feedback message, and extends a second type identity and a device identity in the second feedback message. The first type identity and the second type identity identify a device type of the second electronic device.

For example, in some implementations, the second electronic device may further receive projection indication information sent by the first electronic device, and select, based on the projection indication information, to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a fourth aspect, this application provides another second electronic device. The second electronic device may include but is not limited to a receiving device and the like used in a projection scenario. The second electronic device may include a processor, a memory, and a computer program. The memory is coupled to the processor, and the computer program is stored in the memory. When the computer program is executed by the processor, the second electronic device is enabled to perform the following operations: receiving a first search request sent by a first electronic device, where the first search request is used to search for an electronic device having a first projection receiving capability related to a first projection protocol and an electronic device having a second projection receiving capability related to a second projection protocol; and sending a first feedback message to the first electronic device, where the first feedback message is used to feed back that the second electronic device has the first projection receiving capability, and/or that the second electronic device has the second projection receiving capability.

For example, in some implementations, the first feedback message includes a first capability field that is used by the second electronic device to support projection by using the first projection protocol, and/or includes a second capability field that is used by the second electronic device to support projection by using the second projection protocol.

For example, in some implementations, before sending the first feedback message to the first electronic device, the second electronic device extends a first type identity and a device identity in the first capability field, and extends a second type identity and a device identity in the second capability field. The first type identity and the second type identity identify a device type of the second electronic device. In the foregoing implementations, the first identity and the device identity are extended in the first message, and the second identity and the device are extended in the second message. Therefore, after parsing the first message and the second message, the first device can determine, based on the first identity and/or the second identity, whether the second device is an integrated projection device, so that a foundation is laid for the first device to subsequently generate a single projection identity.

For example, in some implementations, the second electronic device may further receive projection indication information sent by the first electronic device, and select, based on the projection indication information, to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a fifth aspect, this application provides a projection processing method. The projection processing method may be applied to the first electronic device mentioned in the first aspect. In the projection processing method, the first electronic device automatically sends a first search request and a second search request. The first search request is used to search for an electronic device having a first projection receiving capability related to a first projection protocol. The second search request is used to search for an electronic device having a second projection receiving capability related to a second projection protocol. Then, the first electronic device receives a first feedback message and/or a second feedback message from a second electronic device. The first feedback message is used to feed back that the second electronic device has the first projection receiving capability, and/or the second feedback message is used to feed back that the second electronic device has the second projection receiving capability. In addition, the first electronic device automatically displays, in response to the first feedback message and/or the second feedback message, a first identity related to the second electronic device. It should be noted that, when the first feedback message and the second feedback message are used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column; when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column; or when the second feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column.

For example, in some implementations, that when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column includes: When the first feedback message is used to feed back that the second electronic device has the first projection receiving capability, and the second feedback message is used to feed back that the second electronic device does not have the second projection receiving capability, the first identity includes the device identity of the second electronic device and the first control used to trigger projection to the second electronic device by using the first projection protocol, and the device identity and the first control are displayed in a same row or a same column.

For example, in some implementations, that when the second feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column includes: When the first feedback message is used to feed back that the first electronic device does not have the first projection receiving capability, and the second feedback message is used to feed back that the second electronic device has the second projection receiving capability, the first identity includes the device identity of the second electronic device and the second control used to trigger projection to the second electronic device by using the second projection protocol, and the device identity and the second control are displayed in a same row or a same column.

For example, in some implementations, when the first feedback message is used to feed back that the second electronic device does not have the first projection receiving capability, and the second feedback message is used to feed back that the second electronic device does not have the second projection receiving capability, the first identity includes the device identity of the second electronic device.

For example, in some implementations, the first electronic device may receive, within preset duration, the first feedback message and/or the second feedback message from the second electronic device.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, the first capability field includes a first type identity and the device identity, the second capability field includes a second type identity and the device identity, and the first type identity and the second type identity identify a device type of the second electronic device.

For example, in some implementations, before automatically displaying the first identity related to the second electronic device, the first electronic device may further determine a third capability field after the second electronic device is determined as an integrated projection device based on the first type identity and/or the second type identity. The third capability field indicates that the second electronic device supports projection by using the first projection protocol and the second projection protocol. Then, the first electronic device determines a target capability list of the second electronic device based on the third capability field, the first capability field, and the second capability field, and generates the first identity. The first identity is related to the target capability list of the second electronic device.

For example, in some implementations, the first electronic device may determine the third capability field in the following manner. That is, the first electronic device determines a protocol priority capability field, where the protocol priority capability field includes a projection level of the first projection protocol and a projection level of the second projection protocol. Then, the first electronic device determines the third capability field based on the first capability field, the second capability field, and the protocol priority capability field.

For example, in some implementations, the first electronic device may determine the target capability list of the second electronic device based on the third capability field, the first capability field, and the second capability field in the following manner: The first electronic device determines a first capability list and/or a second capability list, where the first capability list includes the first capability field, and the second capability list includes the second capability field. In addition, when the device identity in the first capability field is the same as the device identity in the second capability field, the first electronic device adds the second capability field and the third capability field to the first capability list, to obtain the target capability list of the second electronic device; or when the device identity in the first capability field is the same as the device identity in the second capability field, the first electronic device adds the first capability field and the third priority capability field to the second capability list, to obtain the target capability list of the second electronic device.

For example, in some implementations, the first electronic device may further obtain a tapping instruction for the first identity, and send projection indication information to the second electronic device in response to the tapping instruction. The projection indication information indicates the second electronic device to select to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a sixth aspect, this application provides another projection processing method. The method may be applied to the second electronic device described in the third aspect. In the projection processing method, the second electronic device receives a first search request and a second search request that are sent by a first electronic device. The first search request is used to search for an electronic device having a first projection receiving capability related to a first projection protocol. The second search request is used to search for an electronic device having a second projection receiving capability related to a second projection protocol. In addition, the second electronic device sends a first feedback message and a second feedback message to the first electronic device. The first feedback message is used to feed back that the second electronic device has the first projection receiving capability, and/or the second feedback message is used to feed back that the second electronic device has the second projection receiving capability.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, before sending the first feedback message and the second feedback message to the first electronic device, the second electronic device extends a first type identity and a device identity in the first feedback message, and extends a second type identity and a device identity in the second feedback message. The first type identity and the second type identity identify a device type of the second electronic device.

For example, in some implementations, the second electronic device may further receive projection indication information sent by the first electronic device, and select, based on the projection indication information, to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a seventh aspect, this application provides another projection processing method. The method may be applied to the first electronic device described in the second aspect. In the projection processing method, the first electronic device automatically sends a first search request. The first search request is used to search for an electronic device having a first projection receiving capability related to a first projection protocol and an electronic device having a second projection receiving capability related to a second projection protocol. Then, the first electronic device receives a first feedback message from the second electronic device. The first feedback message is used to feed back that the second electronic device has the first projection receiving capability, and/or that the second electronic device has the second projection receiving capability. In addition, the first electronic device automatically displays, in response to the first feedback message, a first identity related to the second electronic device. It should be noted that, when the first feedback message is used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column; when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column; or when the first feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column.

For example, in some implementations, that when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column includes: When the first feedback message is used to feed back that the second electronic device has the first projection receiving capability, and that the second electronic device does not have the second projection receiving capability, the first identity includes the device identity of the second electronic device and the first control used to trigger projection to the second electronic device by using the first projection protocol, and the device identity and the first control are displayed in a same row or a same column.

For example, in some implementations, that when the first feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column includes: When the first feedback message is used to feed back that the first electronic device does not have the first projection receiving capability, and that the second electronic device has the second projection receiving capability, the first identity includes the device identity of the second electronic device and the second control used to trigger projection to the second electronic device by using the second projection protocol, and the device identity and the second control are displayed in a same row or a same column.

For example, in some implementations, when the first feedback message is used to feed back that the second electronic device does not have the first projection receiving capability, and indicates that the second electronic device does not have the second projection receiving capability, the first identity includes the device identity of the second electronic device.

For example, in some implementations, the first electronic device may receive, within preset duration, the first feedback message from the second electronic device.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, the first capability field includes a first type identity and the device identity, the second capability field includes a second type identity and the device identity, and the first type identity and the second type identity identify a device type of the second electronic device.

For example, in some implementations, before automatically displaying the first identity related to the second electronic device, the first electronic device may further determine a third capability field after the second electronic device is determined as an integrated projection device based on the first type identity and/or the second type identity. The third capability field indicates that the second electronic device supports projection by using the first projection protocol and the second projection protocol. Then, the first electronic device determines a target capability list of the second electronic device based on the third capability field, the first capability field, and the second capability field, and generates the first identity. The first identity is related to the target capability list of the second electronic device.

For example, in some implementations, a manner in which the first electronic device determines the third capability field may be understood with reference to the following manner. That is, the first electronic device determines a protocol priority capability field, where the protocol priority capability field includes a projection level of the first projection protocol and a projection level of the second projection protocol. Then, the first electronic device determines the third capability field based on the first capability field, the second capability field, and the protocol priority capability field.

For example, in some implementations, the first electronic device may determine the target capability list of the second electronic device based on the third capability field, the first capability field, and the second capability field in the following manner: The first electronic device determines a first capability list and/or a second capability list, where the first capability list includes the first capability field, and the second capability list includes the second capability field. In addition, when the device identity in the first capability field is the same as the device identity in the second capability field, the first electronic device adds the second capability field and the third capability field to the first capability list, to obtain the target capability list of the second electronic device; or when the device identity in the first capability field is the same as the device identity in the second capability field, the first electronic device adds the first capability field and the third priority capability field to the second capability list, to obtain the target capability list of the second electronic device.

For example, in some implementations, the first electronic device may further obtain a tapping instruction for the first identity, and send projection indication information to the second electronic device in response to the tapping instruction. The projection indication information indicates the second electronic device to select to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to an eighth aspect, this application provides another projection processing method. The method may be applied to the second electronic device mentioned in the fourth aspect. In the projection processing method, the second electronic device receives a first search request sent by a first electronic device. The first search request is used to search for an electronic device having a first projection receiving capability related to a first projection protocol and an electronic device having a second projection receiving capability related to a second projection protocol. Then, the second electronic device sends a first feedback message to the first electronic device. The first feedback message is used to feed back that the second electronic device has the first projection receiving capability, and/or that the second electronic device has the second projection receiving capability.

For example, in some implementations, the first feedback message includes a first capability field that is used by the second electronic device to support projection by using the first projection protocol, and/or includes a second capability field that is used by the second electronic device to support projection by using the second projection protocol.

For example, in some implementations, before sending the first feedback message to the first electronic device, the second electronic device may further extend a first type identity and a device identity in the first capability field, and extend a second type identity and a device identity in the second capability field. The first type identity and the second type identity identify a device type of the second electronic device.

For example, in some implementations, the second electronic device may further receive projection indication information sent by the first electronic device. In addition, the second electronic device selects, based on the projection indication information, to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a ninth aspect, an embodiment of this application provides a first electronic device. The first electronic device includes a sending unit, an obtaining unit, and a processing unit. The sending unit is configured to automatically send a first search request and a second search request. The first search request is used to search for an electronic device having a first projection receiving capability related to a first projection protocol. The second search request is used to search for an electronic device having a second projection receiving capability related to a second projection protocol. The obtaining unit is configured to receive a first feedback message and/or a second feedback message from a second electronic device. The first feedback message is used to feed back that the second electronic device has the first projection receiving capability, and/or the second feedback message is used to feed back that the second electronic device has the second projection receiving capability. The processing unit is configured to automatically display, in response to the first feedback message and/or the second feedback message, a first identity related to the second electronic device.

In some implementations, when the first feedback message and the second feedback message are used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column.

In some implementations, when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column.

In some implementations, when the second feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column.

For example, in some implementations, that when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column includes: When the first feedback message is used to feed back that the second electronic device has the first projection receiving capability, and the second feedback message is used to feed back that the second electronic device does not have the second projection receiving capability, the first identity includes the device identity of the second electronic device and the first control used to trigger projection to the second electronic device by using the first projection protocol, and the device identity and the first control are displayed in a same row or a same column.

For example, in some implementations, that when the second feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column includes: When the first feedback message is used to feed back that the first electronic device does not have the first projection receiving capability, and the second feedback message is used to feed back that the second electronic device has the second projection receiving capability, the first identity includes the device identity of the second electronic device and the second control used to trigger projection to the second electronic device by using the second projection protocol, and the device identity and the second control are displayed in a same row or a same column.

For example, in some implementations, when the first feedback message is used to feed back that the second electronic device does not have the first projection receiving capability, and the second feedback message is used to feed back that the second electronic device does not have the second projection receiving capability, the first identity includes the device identity of the second electronic device.

For example, in some implementations, the obtaining unit is configured to receive, within preset duration, the first feedback message and/or the second feedback message from the second electronic device.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, the first capability field includes a first type identity and the device identity, the second capability field includes a second type identity and the device identity, and the first type identity and the second type identity identify a device type of the second electronic device.

For example, in some implementations, before automatically displaying the first identity related to the second electronic device, the processing unit is configured to determine a third capability field after the second electronic device is determined as an integrated projection device based on the first type identity and/or the second type identity. The third capability field indicates that the second electronic device supports projection by using the first projection protocol and the second projection protocol. In addition, the processing unit further determines a target capability list of the second electronic device based on the third capability field, the first capability field, and the second capability field, and generates the first identity. The first identity is related to the target capability list of the second electronic device.

For example, in some implementations, the processing unit is configured to: determine a protocol priority capability field, where the protocol priority capability field includes a projection level of the first projection protocol and a projection level of the second projection protocol, and determine the third capability field based on the first capability field, the second capability field, and the protocol priority capability field.

For example, in some implementations, the processing unit is configured to determine a first capability list and/or a second capability list, where the first capability list includes the first capability field, and the second capability list includes the second capability field. In addition, the processing unit is configured to: when the device identity in the first capability field is the same as the device identity in the second capability field, add the second capability field and the third capability field to the first capability list, to obtain the target capability list of the second electronic device; or when the device identity in the first capability field is the same as the device identity in the second capability field, add the first capability field and the third priority capability field to the second capability list, to obtain the target capability list of the second electronic device.

For example, in some implementations, the obtaining unit is further configured to obtain a tapping instruction for the first identity. The processing unit is further configured to send projection indication information to the second electronic device in response to the tapping instruction. The projection indication information indicates the second electronic device to select to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a tenth aspect, this application provides a second electronic device. The second electronic device may include a receiving module and a sending module. The receiving module is configured to receive a first search request and a second search request that are sent by a first electronic device. The first search request is used to search for an electronic device having a first projection receiving capability related to a first projection protocol. The second search request is used to search for an electronic device having a second projection receiving capability related to a second projection protocol. The sending module is configured to send, by the second electronic device, a first feedback message and a second feedback message to the first electronic device. The first feedback message is used to feed back that the second electronic device has the first projection receiving capability, and/or the second feedback message is used to feed back that the second electronic device has the second projection receiving capability.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, the second electronic device further includes a processing module, configured to: before sending the first feedback message and the second feedback message to the first electronic device, extend a first type identity and a device identity in the first feedback message, and extend a second type identity and a device identity in the second feedback message. The first type identity and the second type identity identify a device type of the second electronic device.

For example, in some implementations, the receiving module is further configured to receive projection indication information sent by the first electronic device. The processing module is configured to select, based on the projection indication information, to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to an eleventh aspect, this application provides another first electronic device. The first electronic device includes a sending unit, an obtaining unit, and a processing unit. The sending unit is configured to automatically send a first search request. The first search request is used to search for an electronic device having a first projection receiving capability related to a first projection protocol and an electronic device having a second projection receiving capability related to a second projection protocol. The obtaining unit is configured to receive a first feedback message from the second electronic device. The first feedback message is used to feed back that the second electronic device has the first projection receiving capability, and/or that the second electronic device has the second projection receiving capability. The processing unit is configured to automatically display, in response to the first feedback message, a first identity related to the second electronic device.

In some implementations, when the first feedback message is used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column.

In some implementations, when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column.

In some implementations, when the first feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column.

For example, in some implementations, that when the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column includes: When the first feedback message is used to feed back that the second electronic device has the first projection receiving capability, and that the second electronic device does not have the second projection receiving capability, the first identity includes the device identity of the second electronic device and the first control used to trigger projection to the second electronic device by using the first projection protocol, and the device identity and the first control are displayed in a same row or a same column.

For example, in some implementations, that when the first feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column includes: When the first feedback message is used to feed back that the first electronic device does not have the first projection receiving capability, and that the second electronic device has the second projection receiving capability, the first identity includes the device identity of the second electronic device and the second control used to trigger projection to the second electronic device by using the second projection protocol, and the device identity and the second control are displayed in a same row or a same column.

For example, in some implementations, when the first feedback message is used to feed back that the second electronic device does not have the first projection receiving capability, and indicates that the second electronic device does not have the second projection receiving capability, the first identity includes the device identity of the second electronic device.

For example, in some implementations, the obtaining unit is configured to receive, within preset duration, the first feedback message from the second electronic device.

For example, in some implementations, the first feedback message includes a first capability field that is used by the second electronic device to support projection by using the first projection protocol, and the second feedback message includes a second capability field that is used by the second electronic device to support projection by using the second projection protocol.

For example, in some implementations, the first capability field includes a first type identity and the device identity, the second capability field includes a second type identity and the device identity, and the first type identity and the second type identity identify a device type of the second electronic device.

For example, in some implementations, before automatically displaying the first identity related to the second electronic device, the processing unit is configured to determine a third capability field after the second electronic device is determined as an integrated projection device based on the first type identity and/or the second type identity. The third capability field indicates that the second electronic device supports projection by using the first projection protocol and the second projection protocol. In addition, the processing unit further determines a target capability list of the second electronic device based on the third capability field, the first capability field, and the second capability field, and generates the first identity. The first identity is related to the target capability list of the second electronic device.

For example, in some implementations, the processing unit is configured to: determine a protocol priority capability field, where the protocol priority capability field includes a projection level of the first projection protocol and a projection level of the second projection protocol, and determine the third capability field based on the first capability field, the second capability field, and the protocol priority capability field.

For example, in some implementations, the processing unit is configured to determine a first capability list and/or a second capability list, where the first capability list includes the first capability field, and the second capability list includes the second capability field. In addition, when the device identity in the first capability field is the same as the device identity in the second capability field, the processing unit is further configured to add the second capability field and the third capability field to the first capability list, to obtain the target capability list of the second electronic device; or when the device identity in the first capability field is the same as the device identity in the second capability field, the first electronic device adds the first capability field and the third priority capability field to the second capability list, to obtain the target capability list of the second electronic device.

For example, in some implementations, the obtaining unit is further configured to obtain a tapping instruction for the first identity. The processing unit is further configured to send projection indication information to the second electronic device in response to the tapping instruction. The projection indication information indicates the second electronic device to select to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a twelfth aspect, this application provides another second electronic device. The second electronic device includes a receiving module and a sending module. The receiving module is configured to receive a first search request sent by a first electronic device. The first search request is used to search for an electronic device having a first projection receiving capability related to a first projection protocol and an electronic device having a second projection receiving capability related to a second projection protocol. The sending module is configured to send a first feedback message to the first electronic device. The first feedback message is used to feed back that the second electronic device has the first projection receiving capability, and/or that the second electronic device has the second projection receiving capability.

For example, in some implementations, the first feedback message includes a first capability field that is used by the second electronic device to support projection by using the first projection protocol, and/or includes a second capability field that is used by the second electronic device to support projection by using the second projection protocol.

For example, in some implementations, the second electronic device further includes a processing module. The processing module is configured to: before the second electronic device sends the first feedback message to the first electronic device, extend a first type identity and a device identity in the first capability field, and extend a second type identity and a device identity in the second capability field. The first type identity and the second type identity identify a device type of the second electronic device.

For example, in some implementations, the receiving module is further configured to receive projection indication information sent by the first electronic device. The processing module is configured to select, based on the projection indication information, to perform projection by using the first projection protocol and/or the second projection protocol.

For example, in some implementations, the first projection protocol includes a mirror projection miracast protocol and/or a digital living alliance DLNA protocol, and the second projection protocol includes the miracast protocol and/or the DLNA protocol.

According to a thirteenth aspect, an embodiment of this application provides a projection processing system. The projection processing system includes a first electronic device and a second electronic device. The first electronic device performs functions in the method described in any one of the fifth aspect or the possible implementations of the fifth aspect. The second electronic device performs functions in the method described in any one of the sixth aspect or the possible implementations of the sixth aspect. Alternatively, the first electronic device performs functions in the method described in any one of the seventh aspect or the possible implementations of the seventh aspect. The second electronic device performs functions in the method described in any one of the eighth aspect or the possible implementations of the eighth aspect.

According to a fourteenth aspect, an embodiment of this application provides a computer-readable storage medium, including instructions. When the instructions are run on a computer, the computer is enabled to perform the method according to any one of the fifth aspect or the possible implementations of the fifth aspect; or perform the method according to any one of the sixth aspect or the possible implementations of the sixth aspect; or perform the method according to any one of the seventh aspect or the possible implementations of the seventh aspect; or perform the method according to any one of the eighth aspect or the possible implementations of the eighth aspect.

According to a fifteenth aspect, an embodiment of this application provides a computer program product including instructions. When the computer program product is run on a computer, the computer is enabled to perform the method according to any one of the fifth aspect or the possible implementations of the fifth aspect; or perform the method according to any one of the sixth aspect or the possible implementations of the sixth aspect; or perform the method according to any one of the seventh aspect or the possible implementations of the seventh aspect; or perform the method according to any one of the eighth aspect or the possible implementations of the eighth aspect.

A sixteenth aspect of this application provides a chip system. The chip system may include a processor, configured to: support a first electronic device in implementing functions in the method described in any one of the fifth aspect or the possible implementations of the fifth aspect, or support a second electronic device in implementing functions in the method described in any one of the sixth aspect or the possible implementations of the sixth aspect. Alternatively, the processor is configured to support a first electronic device in performing functions in the method described in any one of the seventh aspect or the possible implementations of the seventh aspect, or support a second electronic device in performing functions in the method described in any one of the eighth aspect or the possible implementations of the eighth aspect.

Optionally, with reference to the seventeenth aspect, in a first possible implementation, the chip system may further include a memory. The memory is configured to store program instructions and data that are necessary for the first electronic device and the second electronic device. The chip system may include a chip, or may include a chip and another discrete device. The chip system may include an application-specific integrated circuit (application-specific integrated circuit, ASIC), a field programmable gate array (field programmable gate array, FPGA), another programmable logic device, or the like. Further, the chip system may include an interface circuit and the like.

It may be learned from the foregoing technical solutions that embodiments of this application have the following advantages:

In embodiments of this application, the first identity may include the device identity of the second electronic device, and at least one of the first control used to trigger projection to the second electronic device by using the first projection protocol and the second control used to trigger projection to the second electronic device by using the second projection protocol, and the device identity and the first control and/or the second control are displayed in a same row or a same column. In this way, the first identity related to the second electronic device is automatically displayed on a display interface of the first electronic device, so that a user can intuitively select, based on one device identity, a corresponding second electronic device for projection, without being confused about which device identity should be selected for projection. In addition, when one of the projection protocols cannot be used to complete projection, the other projection protocol may be directly used to complete projection, and there is no need to switch a projection port to search for a projectable device again. This reduces a process in which the user switches the projection port to re-trigger searching for the second electronic device, reduces complexity of a user operation, and improves ease of use of projection.

BRIEF DESCRIPTION OF THE DRAWINGS

To describe the technical solutions in embodiments of this application more clearly, the following briefly describes the accompanying drawings for describing embodiments. It is clear that the accompanying drawings in the following description show merely some embodiments of this application.

FIG. 4 is a schematic diagram of extending a field in a first message according to an embodiment of this application;

DETAILED DESCRIPTION OF ILLUSTRATIVE EMBODIMENTS

Embodiments of this application provide a first electronic device, a second electronic device, and a projection processing method, to present a first identity related to the single second electronic device to a user, reduce a process in which the user switches a projection port to re-trigger searching for a receiving device, reduce complexity of a user operation, and improve ease of use of projection.

The following clearly and completely describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

In the specification, claims, and accompanying drawings of this application, terms "first", "second", "third", "fourth", and the like (if existent) are intended to distinguish between similar objects but do not necessarily indicate a specific order or sequence. It should be understood that data used in such a way is interchangeable in proper circumstances, so that embodiments of this application described herein, for example, can be implemented in an order other than the order illustrated or described herein. Moreover, terms "include", "have", or any other variant thereof are intended to cover a non-exclusive inclusion. In this application, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between associated objects. "At least one of the following items (pieces)" or a similar expression thereof means any combination of these items, including a singular item (piece) or any combination of plural items (pieces). For example, at least one item (piece) of a, b, or c may indicate: a, b, c, a and b, a and c, b and c, or a, b, and c, where a, b, and c may be singular or plural. It should be noted that "at least one item (piece)" may also be explained as "one item (piece) or more items (pieces)".

Figures 1, 1A:
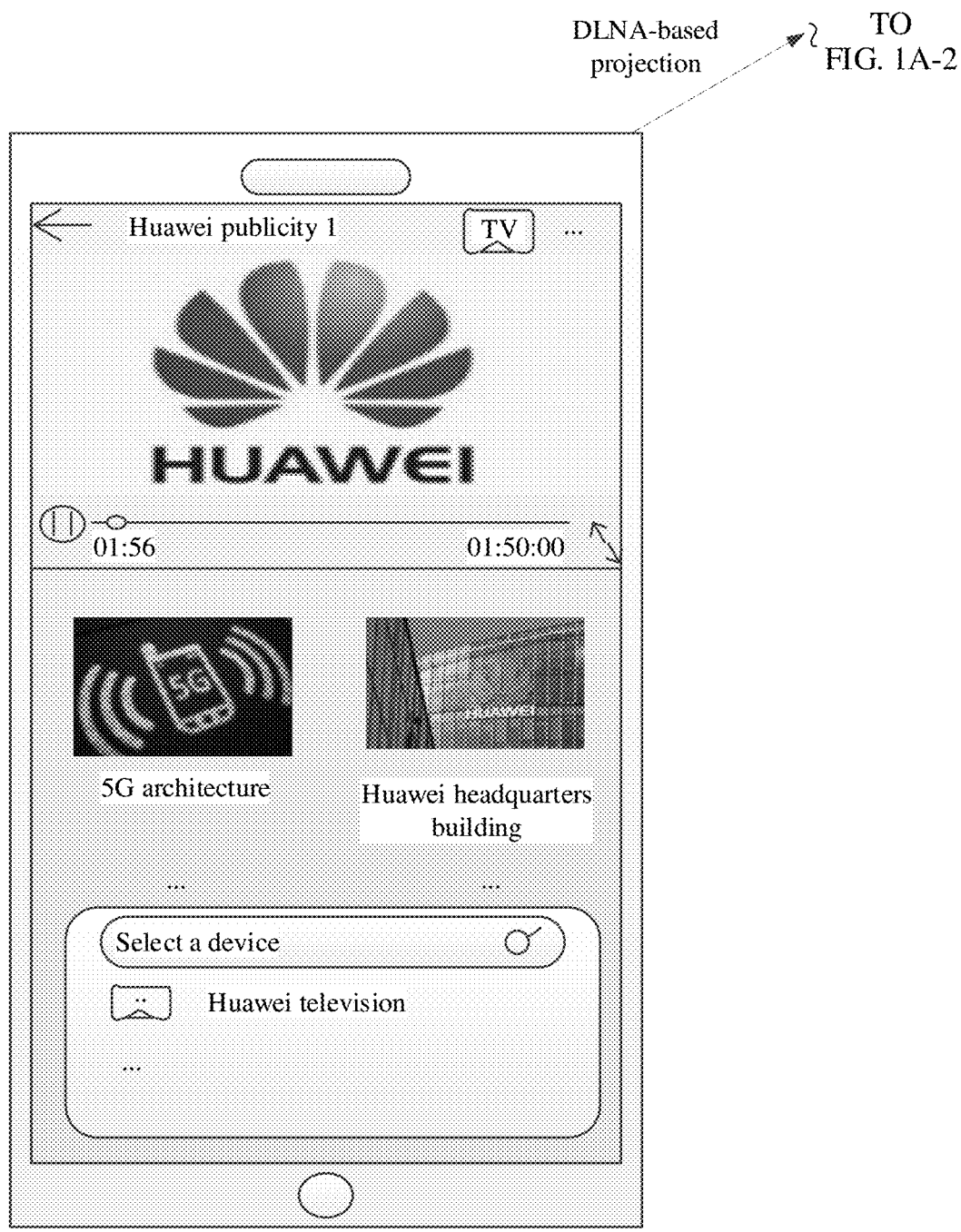
FIG. 1A-1 and FIG. 1A-2 are a schematic diagram of DLNA-based projection in a related solution.
Figures 1, 1A, 2:
Figure 1B:
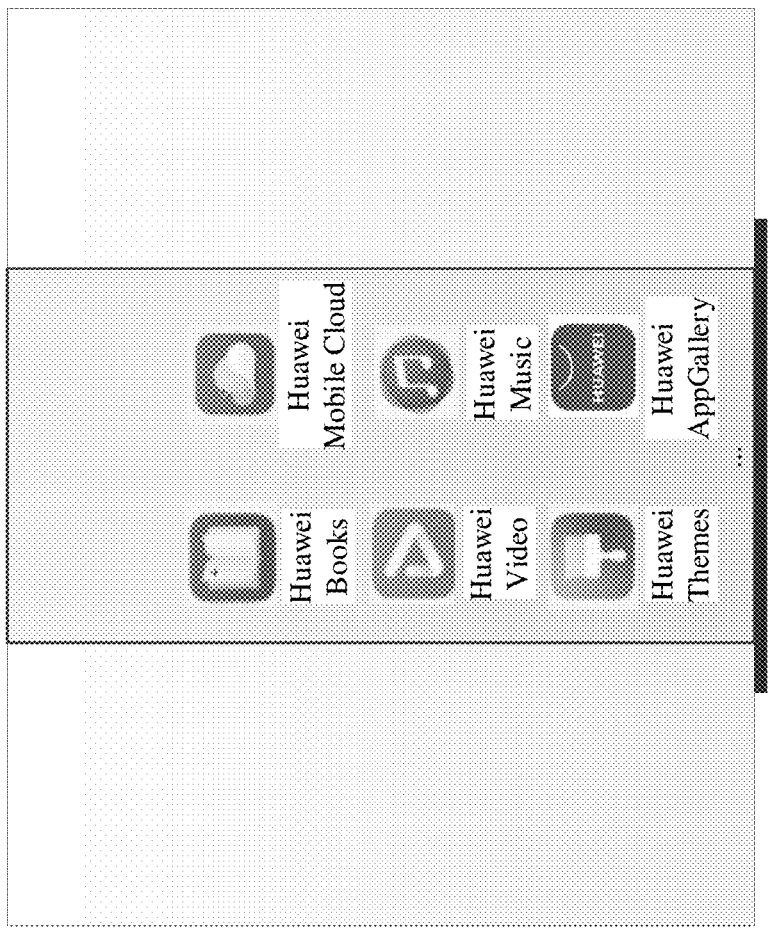
FIG. 1B is a schematic diagram of mirror projection in a related solution.
Figure 1B:
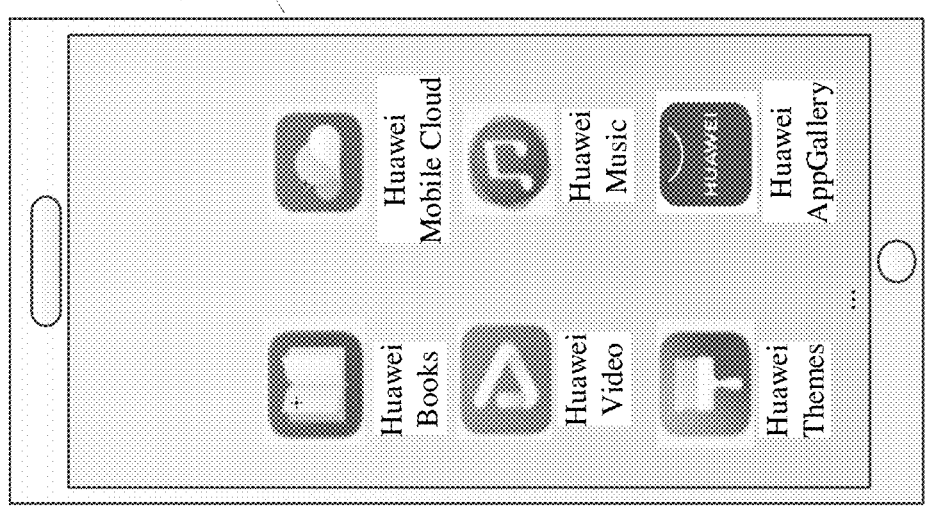

Currently, a mainstream projection solution is implemented by DLNA-based projection and mirror projection. FIG. 1A-1 and FIG. 1A-2 are a schematic diagram of DLNA-based projection in a related solution. As shown in FIG. 1A-1 and FIG. 1A-2, if a user expects to project a video "Huawei publicity 1" played on a current projection device to be displayed on a large-screen receiving device, a projection button (such as "TV") on a video play interface of the projection device is tapped to start searching until a receiving device (such as a Huawei television) is found, and then a display icon or the like of the found receiving device is tapped, to complete DLNA-based projection. In addition, FIG. 1B is a schematic diagram of mirror projection in a related solution. It may be learned from FIG. 1B that mirror projection is to first record content on a display interface of the projection device, for example, Huawei Books, Huawei Mobile Cloud, Huawei Video, Huawei Music, Huawei Themes, and Huawei AppGallery. Then, a recorded data frame is transmitted to a compatible receiving device for playing, to achieve projection or casting.

Figure 1C:
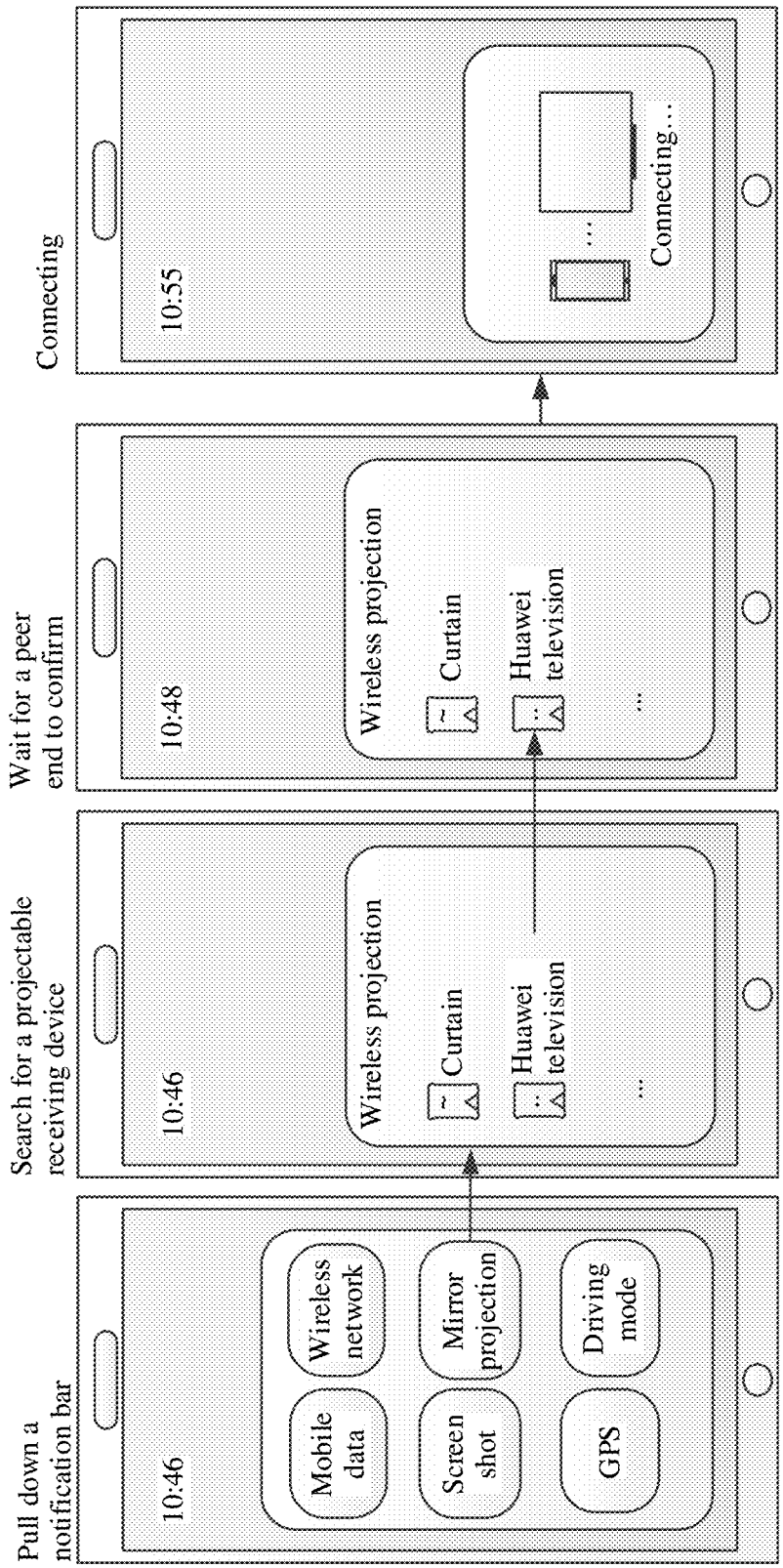
FIG. 1C is a schematic diagram of operation steps of mirror projection.
Figure 1D:
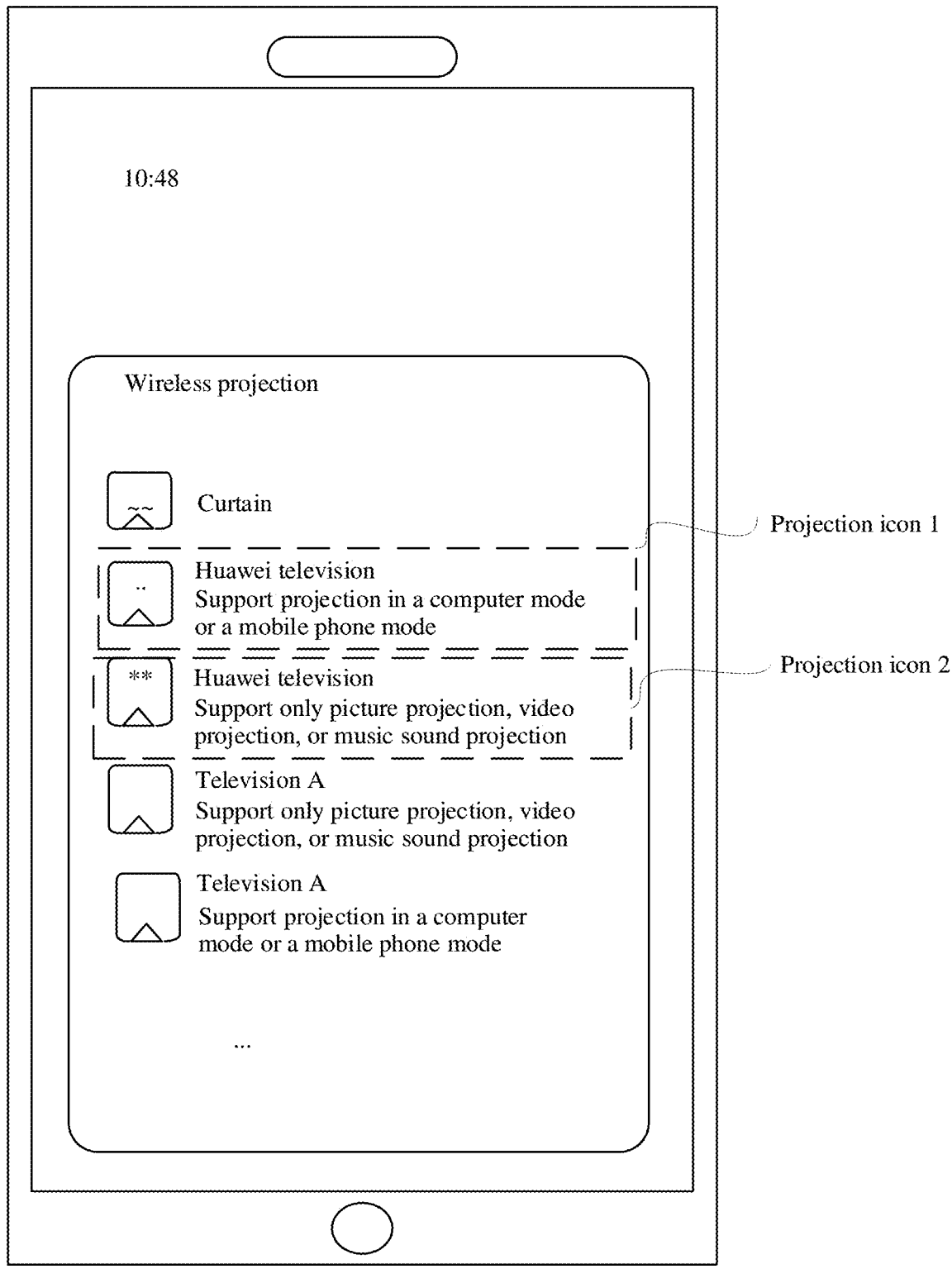
FIG. 1D is a schematic diagram of re-triggering searching for a device in a related solution.

However, if the projection device and the receiving device do not belong to a same local area network, or do not support a DLNA-based projection function, or the like, DLNA-based projection fails. The user expects to continue to complete projection or casting through mirror projection after DLNA-based projection fails. FIG. 1C is a schematic diagram of operation steps of mirror projection. It may be learned from FIG. 1C that, in a process of mirror projection, the user needs to manually enable a mirror projection function at a system port, to re-trigger searching to discover a receiving device. However, to re-trigger the searching process causes problems such as complex operations and long time consumption. In addition, it may be learned from FIG. 1D that, even if a DLNA-based projection capability and a mirror projection capability are integrated into a same projection port, two projection icons are still displayed on the projection device. For example, a projection icon 1 and a projection icon 2 are correspondingly displayed on a same Huawei television. In addition, the user can implement DLNA-based projection by tapping the projection icon 1, for example, projection in a computer mode or a mobile phone mode is supported. Alternatively, the user can implement miracast-based projection by tapping the projection icon 2, for example, picture projection, video projection, or music sound projection is supported. Similarly, for a television A, two projection icons are correspondingly displayed. The user may be confused about the two displayed projection icons, and cannot accurately select a proper receiving device to complete projection or casting.

Figure 2A:
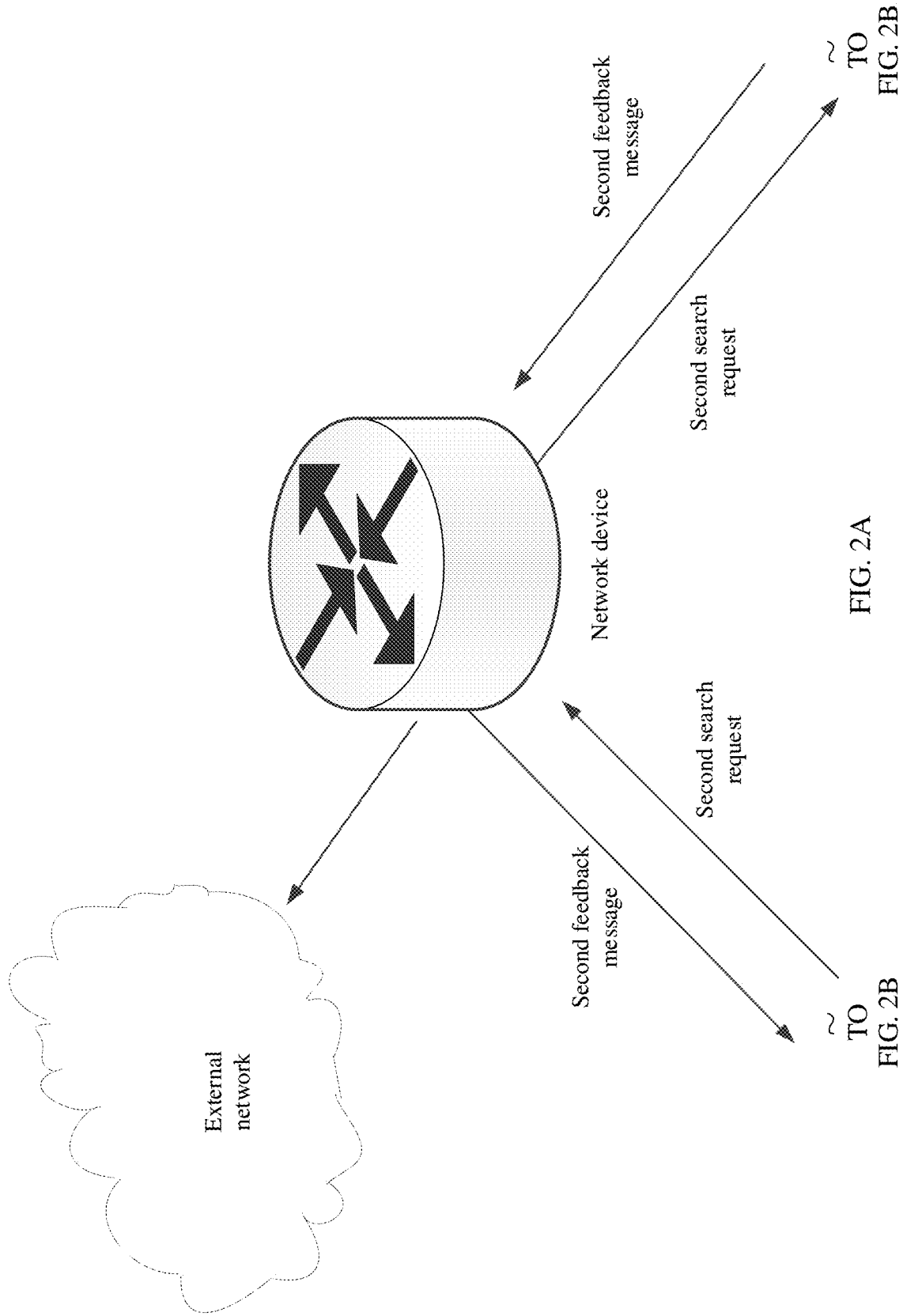
FIG. 2A and FIG. 2B are a schematic diagram of an architecture of a projection processing system according to an embodiment of this application.
Figure 2B:
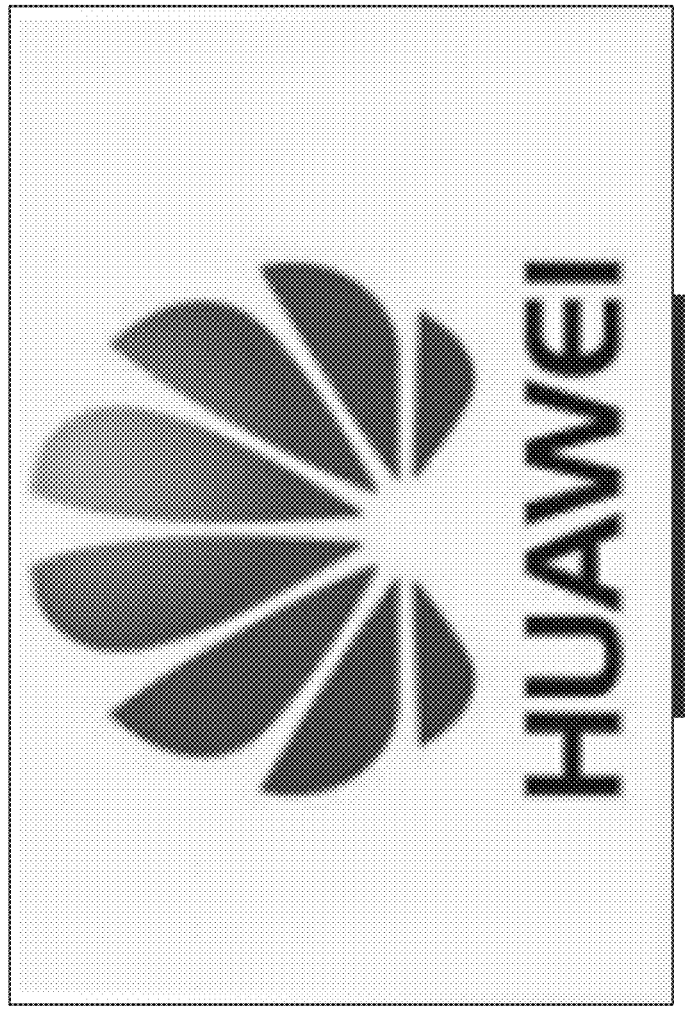
Figure 2B:
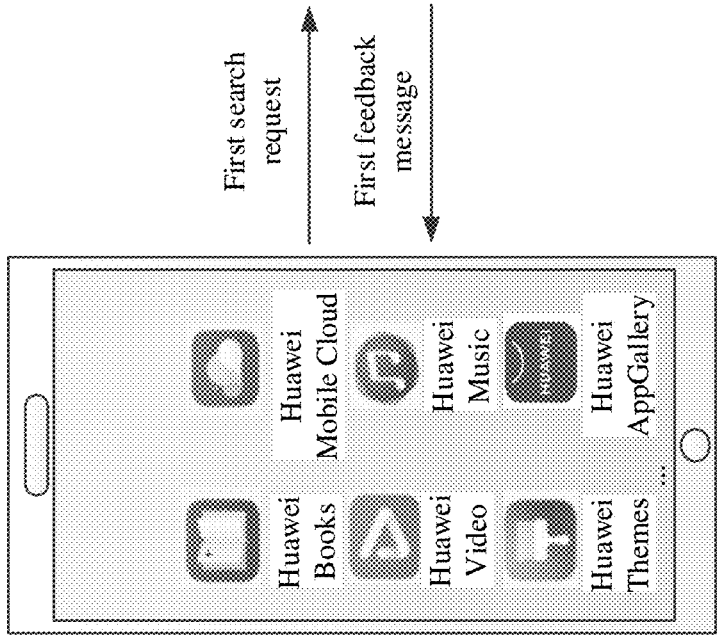

Therefore, for the problem described in the scenarios in FIG. 1A-1 and FIG. 1A-2 to FIG. 1D, an embodiment of this application provides a projection processing method. The projection processing method may be applied to a projection scenario, to present a first identity of a single electronic device to a user, reduce a process in which the user switches a projection port to re-trigger searching for a receiving device, reduce complexity of a user operation, and improve ease of use of projection. FIG. 2A and FIG. 2B are a schematic diagram of an architecture of a projection processing system according to an embodiment of this application. As shown in FIG. 2A and FIG. 2B, the projection processing system includes a first electronic device and a second electronic device. The first electronic device may directly communicate with the second electronic device by using wireless local area network (wireless fidelity, Wi-Fi) peer-to-peer (peer-to-peer, P2P), to complete mirror projection. In addition, the first electronic device and the second electronic device may alternatively be connected to a network device, and a local area network is constructed by using the network device, so that the first electronic device and the second electronic device are deployed in a same local area network, and DLNA-based projection is completed.

It should be noted that the first electronic device mentioned above may also be understood as the projection device in FIG. 1A-1 and FIG. 1A-2 to FIG. 1D. The first electronic device may include but is not limited to various handheld devices, vehicle-mounted devices, wearable devices, or computing devices that have a wireless communication function, or other processing devices connected to a wireless modem, and various forms of user equipment (user equipment, UE), mobile stations (mobile stations, MSs), mobile terminals, and the like. This is not limited herein. The second electronic device may also be understood as the receiving device in FIG. 1A-1 and FIG. 1A-2 to FIG. 1D. The second electronic device may also include but is not limited to a large-screen display device such as a television or a curtain. This is not limited herein. In addition, the network device may also include but is not limited to a router, a switch, and the like. This is not limited herein.

Figure 3:
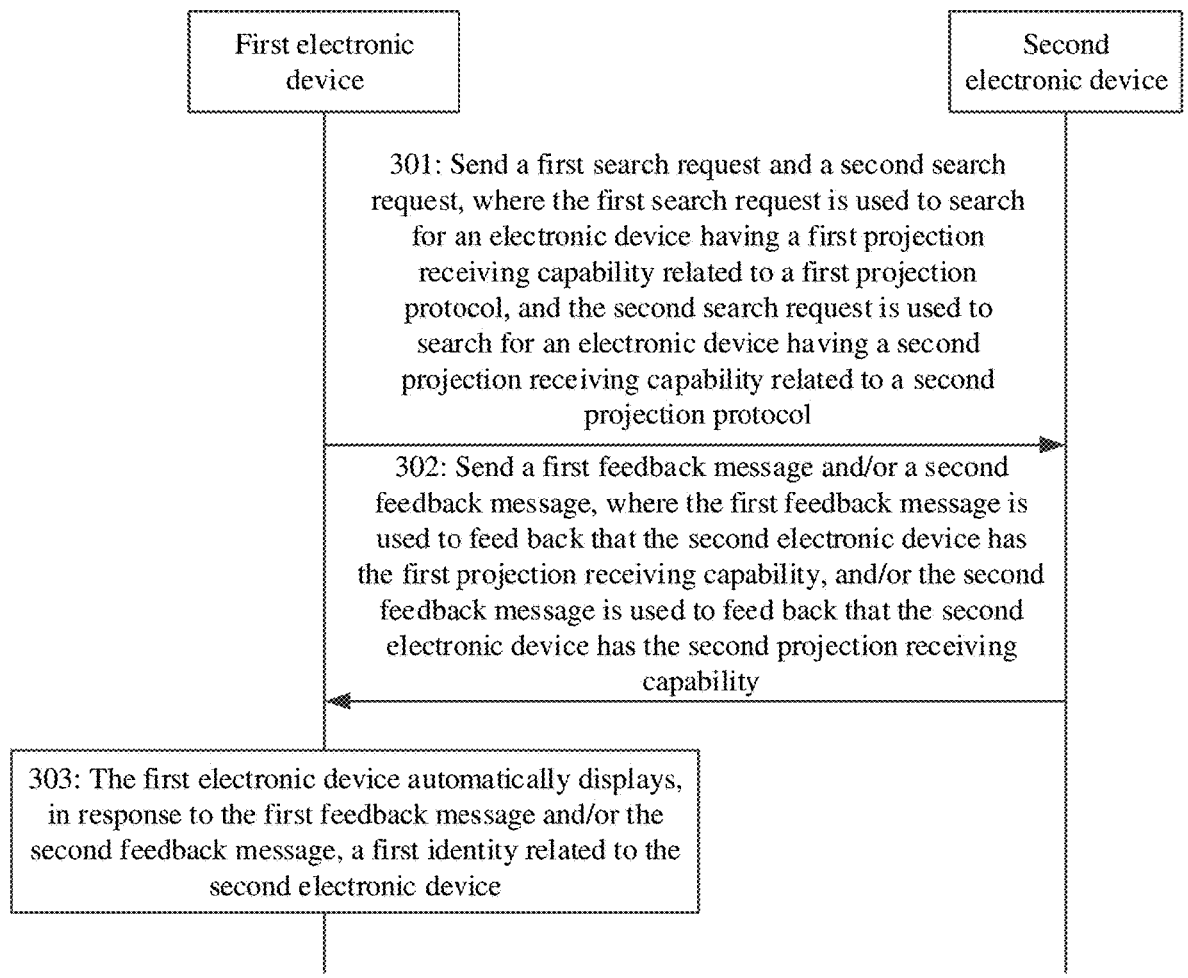
FIG. 3 is a schematic flowchart of a projection processing method according to an embodiment of this application.

For example, FIG. 3 is a schematic flowchart of a projection processing method according to an embodiment of this application. It may be learned from FIG. 3 that the projection processing method may include the following steps.

301: A first electronic device sends a first search request and a second search request, where the first search request is used to search for an electronic device having a first projection receiving capability related to a first projection protocol, and the second search request is used to search for an electronic device having a second projection receiving capability related to a second projection protocol.

In this example, when the first electronic device needs to display projection data such as a video or a photo by using another device, the first electronic device may trigger a search procedure, to discover another large-screen device that can display the projection data, for example, a second electronic device such as a television or a curtain. It may be learned from FIG. 1D that, a same second electronic device may have a mirror projection capability, and may also have a DLNA-based projection capability, and that device identities of the same second electronic device having different projection capabilities are displayed in different rows. On this basis, to enable the second electronic device to have only one identity on a display interface of the first electronic device, in a scenario in which the first electronic device preferentially triggers the search procedure, the first search request and the second search request may be sent to the second electronic device. The first search request is used to search for the electronic device having the first projection receiving capability related to the first projection protocol. The second search request is used to search for the electronic device having the second projection receiving capability related to the second projection protocol. Alternatively, in some other possible scenarios, the first electronic device may not send the first search request and the second search request to the second electronic device. Instead, the second electronic device actively notifies a first feedback message and a second feedback message. It should be noted that the first feedback message and the second feedback message may be understood with reference to content in a subsequent step 302. Details are not described herein. Moreover, a manner of obtaining the first feedback message and the second feedback message is not limited in this application.

It should be noted that the first search request may be a probe frame, namely, a peer-to-peer (peer-to-peer, P2P) information element (information element, IE) frame. Refer to the projection scenario in which the first electronic device is connected to the second electronic device by using Wi-Fi P2P shown in FIG. 2A and FIG. 2B. After starting miracast scanning, the first electronic device may discover the second electronic device by scanning based on the probe frame.

In addition, the second search request may include an M-search message. The M-search message may be used to request to search for an electronic device in a multicast scenario. Refer to the projection scenario in which the first electronic device and the second electronic device establish a connection by using the network device shown in FIG. 2A and FIG. 2B. After starting a DLNA-based search, the first electronic device sends an M-search message to the network device. Further, the network device broadcasts the M-search message in a local area network, to perform searching to discover the second electronic device.

It should be noted that the first projection protocol mentioned above may be a miracast protocol, or may be a DLNA protocol. During actual application, the first projection protocol may alternatively be another protocol. This is not limited herein. In addition, the second projection protocol may be the DLNA protocol, or may be the miracast protocol. During actual application, the second projection protocol may alternatively be another protocol. This is not limited herein.

In addition, the first projection protocol may be the same as or different from the second projection protocol. For example, when the first projection protocol is different from the second projection protocol, the first projection protocol may be the miracast protocol used when the second electronic device supports mirror projection, and the second projection protocol may be the DLNA protocol used when the same second electronic device supports DLNA-based projection; or the first projection protocol may be the DLNA protocol used when the second electronic device supports DLNA-based projection, and the second projection protocol may be the miracast protocol used when the same second electronic device supports mirror projection. This is not limited herein. In addition, when the first projection protocol is the same as the second projection protocol, the first projection protocol may alternatively be the DLNA protocol used when an application A in the second electronic device supports DLNA-based projection, and the second projection protocol may be the DLNA protocol used when an application B in the second electronic device supports DLNA-based projection; or the first projection protocol and the second projection protocol may be the miracast protocol used when the application A and the application B support mirror projection, or the like. It should be noted that the application A is different from the application B.

302: The second electronic device sends the first feedback message and/or the second feedback message to the first electronic device, where the first feedback message is used to feed back that the second electronic device has the first projection receiving capability, and/or the second feedback message is used to feed back that the second electronic device has the second projection receiving capability.

In this example, when the second electronic device has the first projection receiving capability supporting the first projection protocol and/or the second projection receiving capability supporting the second projection protocol, after receiving the first search request directly sent by the first electronic device, the second electronic device may respond to the first search request. Alternatively, the second electronic device may actively send the first feedback message to the first electronic device. Similarly, after receiving the second search request broadcast by the network device, the second electronic device may also respond to the second search request. Alternatively, the second electronic device may actively send the second feedback message to the first electronic device. For example, the second electronic device may directly send the first feedback message to the first electronic device by using Wi-Fi P2P, or may send the second feedback message to the first electronic device through the network device in a broadcast manner.

It should be understood that the first feedback message is a response message of the second electronic device in response to the first search request, and the second feedback message is a response message of the second electronic device in response to the second search request. During actual application, the first feedback message may be a response frame of a P2P IE frame, and the second feedback message may be a notify (Notify) message or the like. This is not limited herein. The notify message may be used in a multicast scenario, and is used to feed back request-related information to an electronic device that sends the M-search message.

To facilitate the first electronic device to determine whether the second electronic device is a device capable of receiving projection in various manners, before sending the first feedback message and/or the second feedback message to the first electronic device, the second electronic device may further extend a first type identity and a device identity in the first feedback message, and extend a second type identity and a device identity in the second feedback message.

It should be understood that both the first type identity and the second type identity may identify a device type of the second electronic device. The device identity may include but is not limited to a device identification code such as an ID, a unique device identifier (unique device identifier, UDID), or the like of the second electronic device.

In addition, in some examples, a device capable of receiving projection in various manners may also be referred to as an integrated projection device or another name. Details are not described herein. The integrated projection device is used as an example. Because a first capability field in the first projection receiving capability may support projection by using the first projection protocol, and a second capability field in the second projection receiving capability may be used to support projection by using the second projection protocol, if the first capability field of a specific device for supporting the first projection protocol and the second capability field of the device for supporting the second projection protocol can be combined, the device may be referred to as an integrated projection device. For example, the first projection protocol is the miracast protocol, and the second projection protocol is the DLNA protocol. If a first capability field of a device A for supporting the miracast protocol and a second capability field of the device A for supporting the DLNA protocol can be combined, the device A may be referred to as an integrated projection device.

FIG. 4 is a schematic diagram of extending a field in a first feedback message according to an embodiment of this application. It may be learned from FIG. 4 that two type-length-value (type-length-value, TLV) structures are extended and added to the first feedback message. One TLV structure is used to store a first type identity (for example, a product identity (product identity, product ID)). The other TLV structure is used to store a device identity (device ID), for example, a UDID.

Optionally, an additional field (for example, HW-Cast) may also be extended in a second feedback message, to store a second type identity and the device identity. For example, the second feedback message after field extension may be understood with reference to the following example:
NOTIFY*HTTP/1.1
Host: 239.255.255.250:1900
Cache-control: max-age=1800
Location: http://192.168.0.1:49152/des.xml
Nt: upnp: rootdevice
Nts: ssdp: alive
HW-Cast: id=xx xxxx It should be noted that the foregoing NOTIFY*HTTP/1.1 indicates that a type of the current second feedback message is a notify message. The Host field indicates a multicast address reserved for the simple service discovery protocol (simple service discovery protocol, SSDP), that is, 239.255.255.250:1900. In addition, a value of max-age in the Cache-control field indicates that a second electronic device is invalid after this time period (unit: second). The Location field indicates a uniform resource locator (uniform resource locator, URL) of a description file of the second electronic device. In addition, a field value in the Nt (Notification type) field indicates that the second electronic device is a "root device". The Nts (Notification type sub) field indicates that the field needs to be ssdp: alive specified in the standard. The HW-Cast field is a field newly added by the second electronic device to the second feedback message, to store the second type identity and the device identity. It should be understood that the HW-Cast field is merely used as an example for description herein. During actual application, another field name may be used for replacement. This is not limited herein.

After extending the first type identity and the device identity in the first feedback message, the second electronic device sends the first feedback message to the first electronic device. The first feedback message includes a first capability field that is used by the second electronic device to support a first projection protocol, and indicates that the second electronic device has a first projection receiving capability. For example, the first capability field may be understood with reference to the following Table 1:

TABLE 1

| First capability field | Device serial number |
| --- | --- |
| | Device name |
| | First type identity |
| | Device identity |
| | Physical address |
| | High bandwidth digital content protection |

It may be learned from Table 1 that, the first capability field includes the newly added first type identity and the newly added device identity (UDID). The first type identity identifies a device type (DeviceType) of the second electronic device. In addition, the first capability field further includes fields such as the device serial number (DeviceId), the device name (DeviceName), the physical address (MacAddress), and the high bandwidth digital content protection (high bandwidth digital content protection, HDCP). It should be noted that in addition to the fields shown in Table 1, the first capability field may further include another field during actual application. This is not limited herein.

Similarly, after extending the second type identity and the device identity in the second feedback message, the second electronic device may send the second feedback message to the first electronic device by using the network device shown in FIG. 2A. The second feedback message includes a second capability field that is used by the second electronic device to support a second projection protocol, and indicates that the second electronic device has a second projection receiving capability. For example, the second capability field may be understood with reference to the following Table 2:

TABLE 2

| Second capability field | Device serial number |
| --- | --- |
| | Device name |
| | Second type identity |
| | Device identity |
| | Physical identity |
| | Manufacturer |
| | Media ability |

As shown in Table 2, the second capability field includes the newly added second type identity and the device identity (UDID). The second type identity identifies the device type (DeviceType) of the second electronic device. In addition, the second capability field further includes fields such as the device serial number (DeviceId), the device name (Device-Name), the physical identity (MacAddress), the manufacturer (Manufacturer), and the media ability (MediaAbility). It should be noted that, in addition to the fields shown in Table 2, the second capability field may further include another field during actual application. This is not limited herein.

For example, in some possible embodiments, the first electronic device may receive, within preset duration, the first feedback message and/or the second feedback message from the second electronic device. It should be noted that a specific value of the preset duration is not limited in embodiments of this application.

303: The first electronic device automatically displays, in response to the first feedback message and/or the second feedback message, a first identity related to the second electronic device.

In this example, the first identity may include the device identity of the second electronic device, and further include at least one of a first control used to trigger projection to the second electronic device by using the first projection protocol and a second control used to trigger projection to the second electronic device by using the second projection protocol.

When the first electronic device receives different feedback messages sent by the second electronic device, different first identities may be displayed. The following describes in detail based on three different cases.

①  When the first feedback message and the second feedback message are used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column.

In this example, the first feedback message is used to feed back that the second electronic device has the first projection receiving capability, and the second feedback message is used to feed back that the second electronic device has the second projection receiving capability. Therefore, when the first electronic device receives the first feedback message and the second feedback message that are fed back by the second electronic device, the first electronic device may display the first identity on a display interface of the first electronic device. In this case, the first identity may include the device identity of the second electronic device, the first control used to trigger projection to the second electronic device by using the first projection protocol, and the second control used to trigger projection to the second electronic device by using the second projection protocol. In addition, the device identity, the first control, and the second control need to be displayed in a same row or a same column.

Figure 5A:
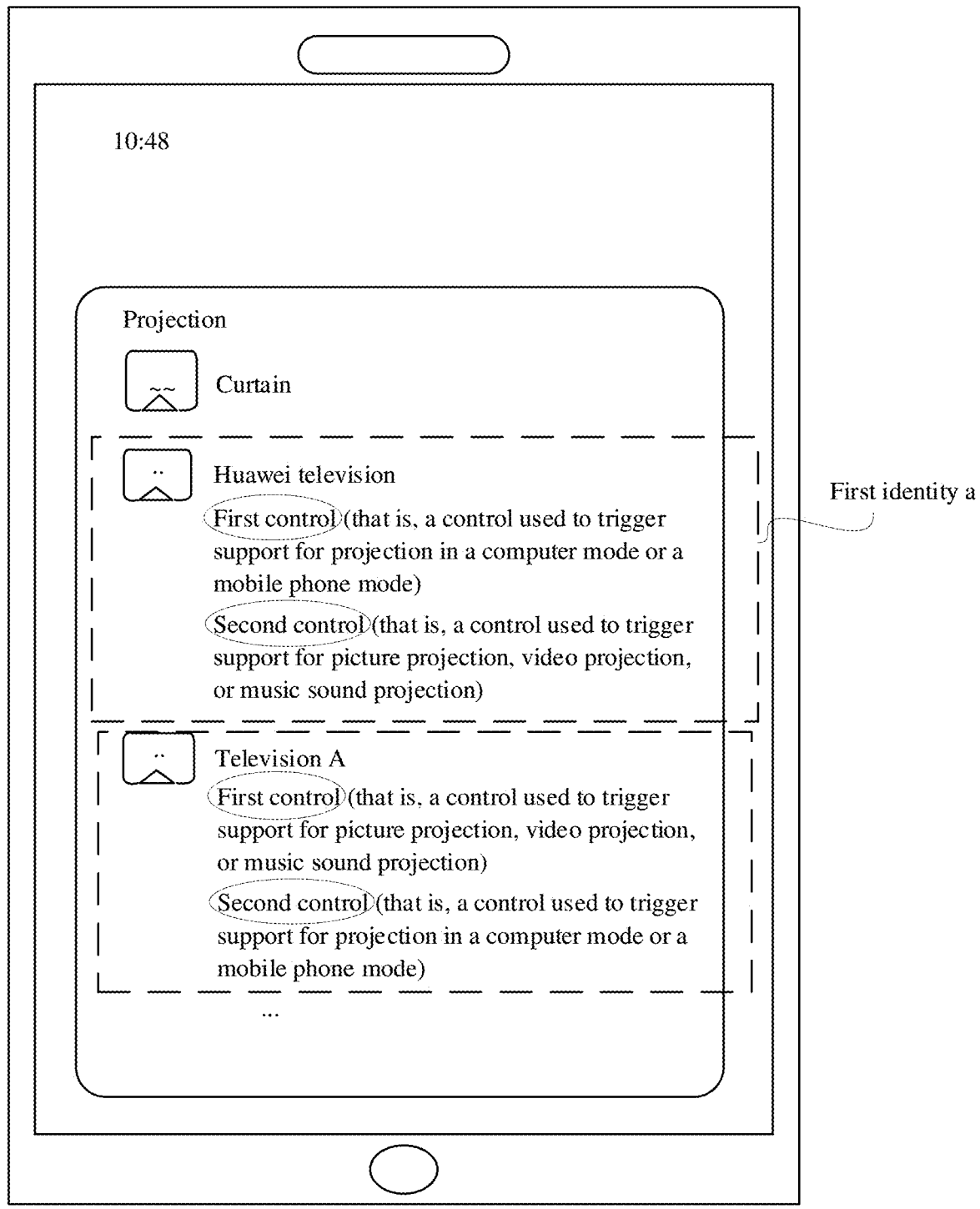
FIG. 5A to FIG. 5C are diagrams of a display interface according to an embodiment of this application.

For example, FIG. 5A is a diagram of a display interface according to an embodiment of this application. As shown in FIG. 5A, it is assumed that the second electronic device is a Huawei television, only one first identity a related to the Huawei television is displayed on the display interface of the first electronic device. In addition, the first identity a includes a device identity (that is, the Huawei television) of the Huawei television, a first control (that is, a control used to trigger support for projection in a computer mode or a mobile phone mode), and a second control (that is, a control used to trigger support for picture projection, video projection, or music sound projection). In addition, it may further be learned from FIG. 5A that the device identity of the Huawei television, the first control, and the second control are displayed in a same column. Similarly, when the second electronic device is a television A, a device identity of the television A, a first control, and a second control are also displayed in a same column.

② When the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column.

In this example, when the first electronic device receives the first feedback message fed back by the second electronic device, the first electronic device may display the first identity on a display interface of the first electronic device. In this case, the first identity may include the device identity of the second electronic device and the first control used to trigger projection to the second electronic device by using the first projection protocol. In addition, the device identity and the first control need to be displayed in a same row or a same column.

Figure 5B:
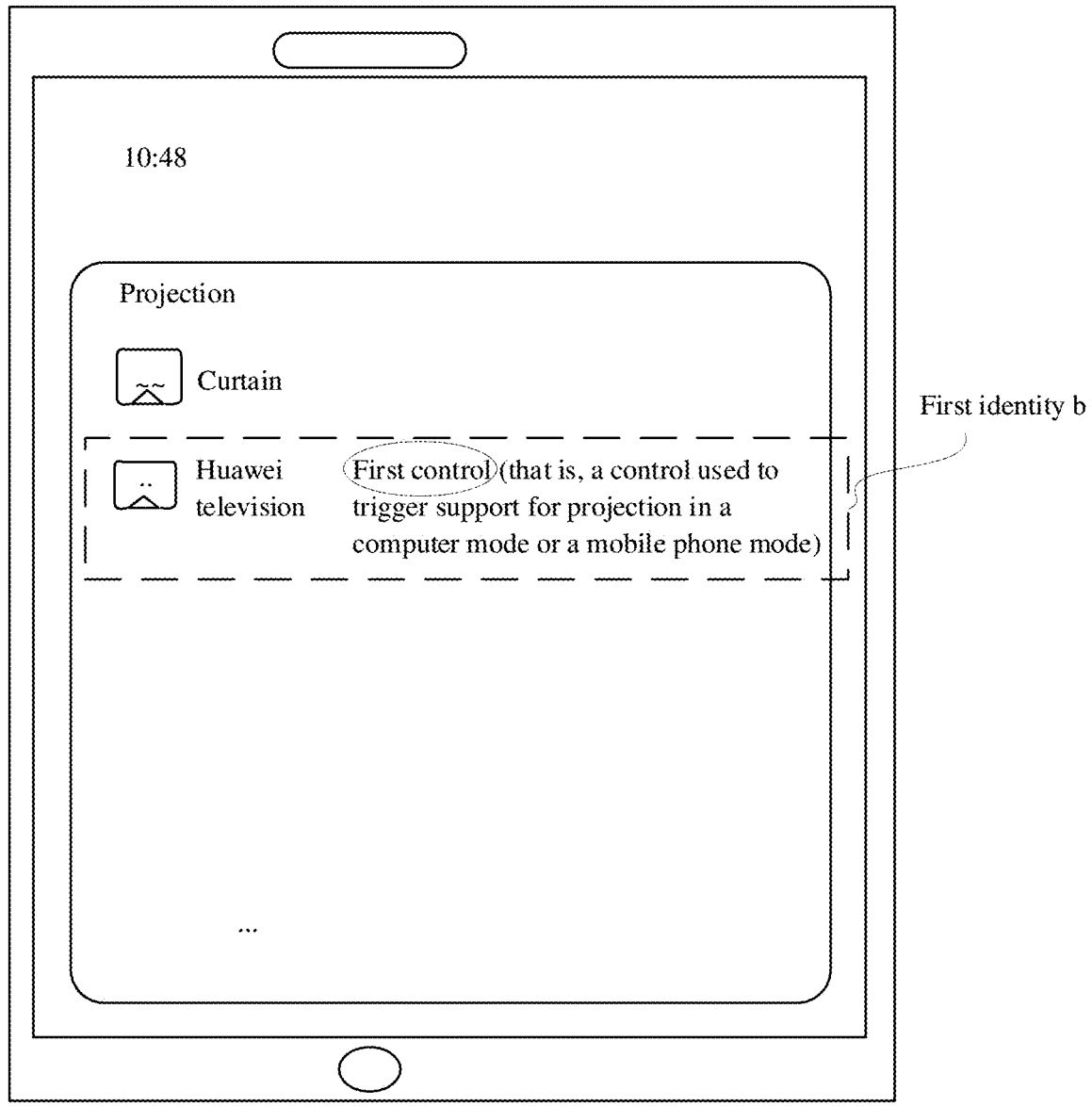

For example, FIG. 5B is a diagram of another display interface according to an embodiment of this application. As shown in FIG. 5B, only one first identity b related to the second electronic device is displayed on the display interface of the first electronic device. In addition, the first identity b includes a device identity (that is, a Huawei television) of the second electronic device and a first control (a control used to trigger support for projection in a computer mode or a mobile phone mode). In addition, it may further be learned from FIG. 5B that the device identity and the first control are displayed in a same row.

It should be understood that the case shown in ② may also be further understood as a case in which the first feedback message is used to feed back that the second electronic device has the first projection receiving capability, and the second feedback message is used to feed back that the second electronic device does not have the second projection receiving capability. In this case, the first identity includes only the device identity of the second electronic device and the first control, and the device identity and the first control are in a same row or a same column.

③ When the second feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column.

In this example, when the first electronic device receives only the second feedback message fed back by the second electronic device, and does not receive the first feedback message fed back by the second electronic device, the first electronic device may display the first identity on a display interface of the first electronic device. In this case, the first identity may include the device identity of the second electronic device and the second control used to trigger projection to the second electronic device by using the second projection protocol. In addition, the device identity and the second control need to be displayed in a same row or a same column.

Figure 5C:
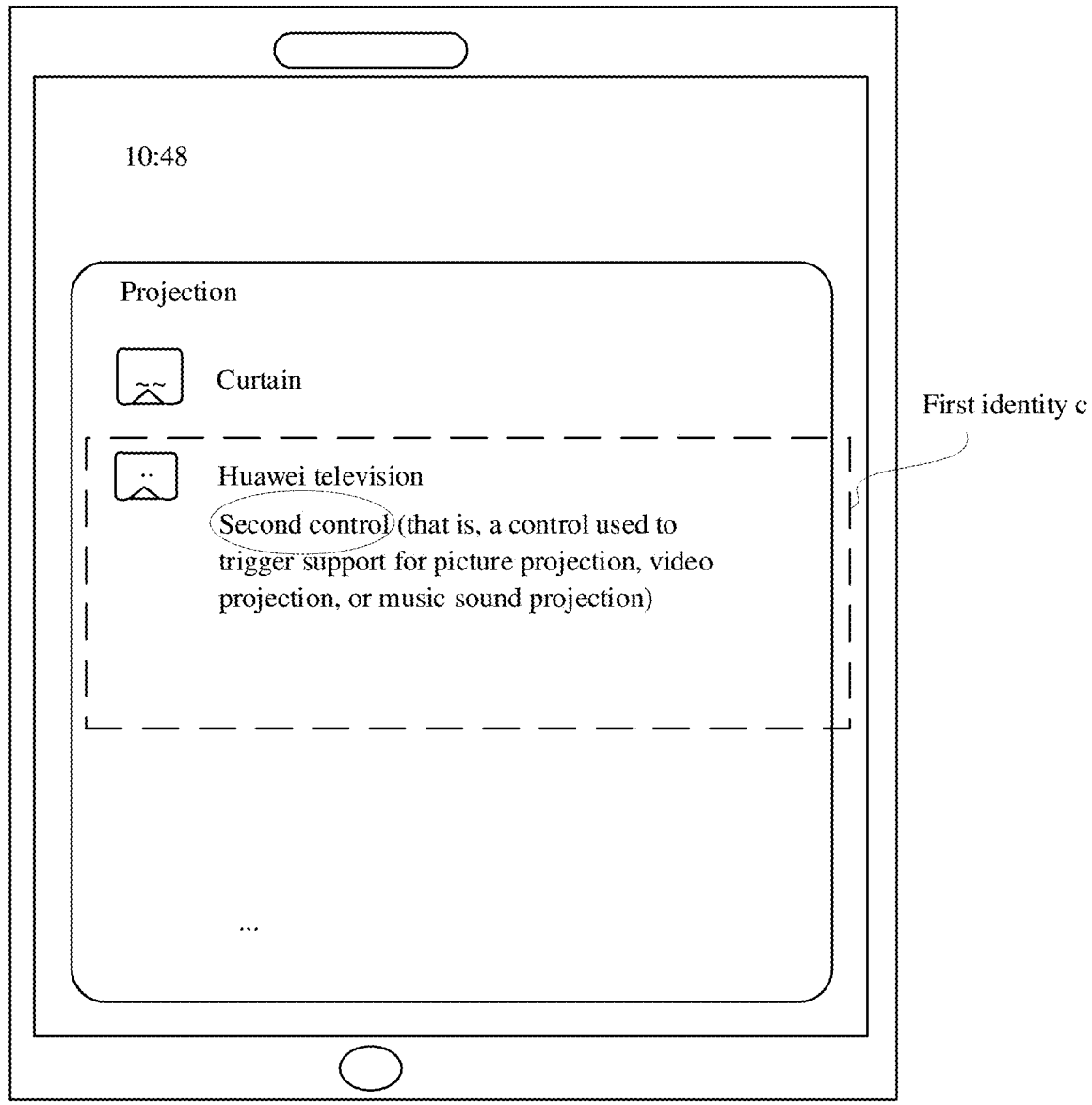

For example, FIG. 5C is a diagram of another display interface according to an embodiment of this application. As shown in FIG. 5C, only one first identity c related to the second electronic device is displayed on the display interface of the first electronic device. In addition, the first identity c includes a device identity (that is, a Huawei television) of the second electronic device and a second control (that is, a control used to support picture projection, video projection, or music sound projection). In addition, it may further be learned from FIG. 5C that the device identity and the second control are displayed in a same column.

It should be understood that the case shown in ③ may also be further understood as a case in which the first feedback message is used to feed back that the second electronic device does not have the first projection receiving capability, and the second feedback message is used to feed back that the second electronic device has the second projection receiving capability. In this case, the first identity includes only the device identity of the second electronic device and the second control, and the device identity and the second control are in a same row or a same column.

In this way, the first electronic device only needs to display, in a same row or a same column on the display interface, the first identity related to the single second electronic device, and does not need to separately display, in a plurality of rows or a plurality of columns, different controls that are of the same second electronic device and that are used to trigger projection by using different protocols, to present the first identity of the single second electronic device to the user. Therefore, the user does not need to be confused about which identity should be selected for projection when selecting the second electronic device for projection on the display interface of the first electronic device.

In some other possible implementations, when the first feedback message is used to feed back that the second electronic device does not have the first projection receiving capability, and the second feedback message is used to feed back that the second electronic device does not have the second projection receiving capability, the first identity may alternatively include only the device identity of the second electronic device.

For example, in some other possible implementations, before performing step 303, the first electronic device may further perform the following steps.

S01: A third capability field is determined after the second electronic device is determined, based on the first type identity in the first capability field and/or the second type identity in the second capability field, as an integrated projection device, where the third capability field indicates that the second electronic device supports the first projection protocol and the second projection protocol.

In this example, the first type identity indicates the device type of the second electronic device, and the second type identity also indicates the device type of the second electronic device. Therefore, after receiving the first feedback message and/or the second feedback message fed back by the second electronic device, the first electronic device can determine, based on the first type identity and/or the second type identity, whether the second electronic device is an integrated projection device. For example, the first electronic device may match the first type identity and/or the second type identity with a type identity of a preset integrated projection device. If the first type identity and/or the second type identity match/matches the type identity of the preset integrated projection device, the first electronic device may determine that the second electronic device is an integrated projection device.

After determining that the second electronic device is an integrated projection device, the first electronic device further needs to combine the first capability field and the second capability field, to determine the third capability field. It should be understood that the third capability field can indicate that the second electronic device supports the first projection protocol and the second projection protocol.

In some possible examples, to facilitate subsequent automatic selection of a projection protocol having a higher priority for projection, the first electronic device may determine the third capability field in the following manner: The first electronic device determines a protocol priority capability field, and determines the third capability field based on the first capability field, the second capability field, and the protocol priority capability field.

Figure 6:
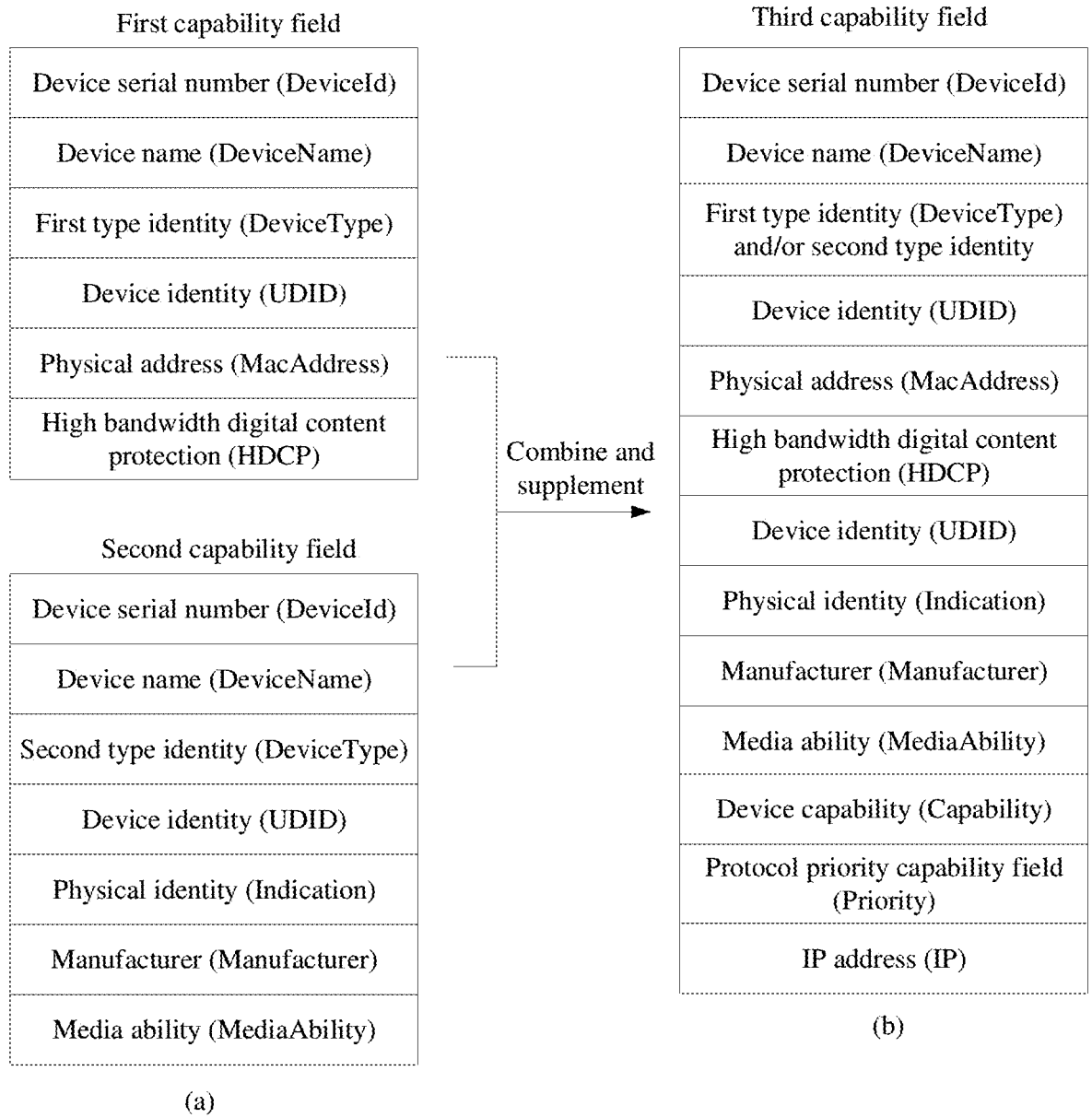
FIG. 6 is a schematic diagram of capability field combination according to an embodiment of this application.

That is, the first electronic device combines the first capability field (refer to the foregoing Table 1) and the second capability field (refer to the foregoing Table 2), and adds the protocol priority capability field in a supplementary manner, to obtain the third capability field. FIG. 6 is a schematic diagram of capability field combination according to an embodiment of this application. As shown in FIG. 6, a part (a) shows the first capability field (for details, refer to the foregoing Table 1) and the second capability field (for details, refer to the foregoing Table 2), and a part (b) shows the third capability field obtained by combining and supplementing the capability fields. It may be learned from the part (b) that the third capability field includes the device serial number, the device name, the first type identity and/or the second type identity, the device identity, the physical address, the high bandwidth digital content protection, the manufacturer, the media ability, a device capability (Capability), and the protocol priority capability field (Priority). In addition, the third capability field may further include a field such as an internet protocol (internet protocol, IP) address or the like. This is not limited herein.

The mentioned protocol priority capability field includes a projection level of the first projection protocol and a projection level of the second projection protocol. The projection level of the first projection protocol reflects a projection priority of the first projection protocol. The projection level of the second projection protocol may also reflect a projection priority of the second projection protocol. It should be noted that the projection level of the first projection protocol may be lower than the projection level of the second projection protocol, or may be higher than the projection level of the second projection protocol. For example, when the first projection protocol is the miracast protocol and the second projection protocol is the DLNA protocol, the projection level of the first projection protocol may be lower than the projection level of the second projection protocol. Alternatively, when the first projection protocol is the DLNA protocol and the second projection protocol is the miracast protocol, the projection level of the first projection protocol may be higher than the projection level of the second projection protocol. This is not limited herein. In addition, when the first projection protocol is the same as the second projection protocol, the projection level of the first projection protocol may also be equal to the projection level of the second projection protocol.

In addition, that the projection level of the first projection protocol is lower than the projection level of the second projection protocol may be understood as that when the second electronic device has both the first projection receiving capability supporting the first projection protocol and the second projection receiving capability supporting the second projection protocol, the second projection protocol is preferentially selected for projection. Herein, only an example in which the projection level of the first projection protocol is lower than the projection level of the second projection protocol is used for description. Similarly, that the projection level of the first projection protocol is higher than the projection level of the second projection protocol may be understood as that when the second electronic device has both the first projection receiving capability supporting the first projection protocol and the second projection receiving capability supporting the second projection protocol, the first projection protocol is preferentially selected for projection. This is not limited herein.

It should be noted that, if the first type identity and/or the second type identity do/does not match the type identity of the preset integrated projection device, the first electronic device may also determine that the second electronic device is not an integrated projection device. In this case, the first electronic device may add the second electronic device to a projectable device storage linked list, to subsequently provide a plurality of possible matching identities for a matching scenario. For example, the first electronic device adds the second electronic device supporting the first projection protocol to a first projectable device storage linked list. All projectable devices in the first projectable device storage linked list may be used to support projection by using the first projection protocol. Similarly, the first electronic device may also add the second electronic device supporting the second projection protocol to a second projectable device storage linked list. All projectable devices in the second projectable device storage linked list may be used to support projection by using the second projection protocol.

S02: The first electronic device determines a target capability list of the second electronic device based on the third capability field, the first capability field, and the second capability field.

In this example, before determining whether the second electronic device is an integrated projection device, the first electronic device separately stores the first projectable device storage linked list and the second projectable device storage linked list. Refer to S01 for understanding. After determining the third capability field, the first electronic device also needs to further combine the first projectable device storage linked list and the second projectable device storage linked list, to determine the target capability list of the second electronic device. It should be noted that the target capability list of the second electronic device needs to include the third capability field, the first capability field, and the second capability field.

In some other possible examples, for a manner of determining the target capability list of the second electronic device in step S02, the first electronic device may implement in the following two proposed manners.

(1) The first electronic device determines a first capability list and/or a second capability list, where the first capability list includes the first capability field, and the second capability list includes the second capability field. Then, when the device identity in the first capability field is the same as the device identity in the second capability field, the first electronic device adds the second capability field and the third capability field to the first capability list, to obtain the target capability list of the second electronic device.

Figure 7:
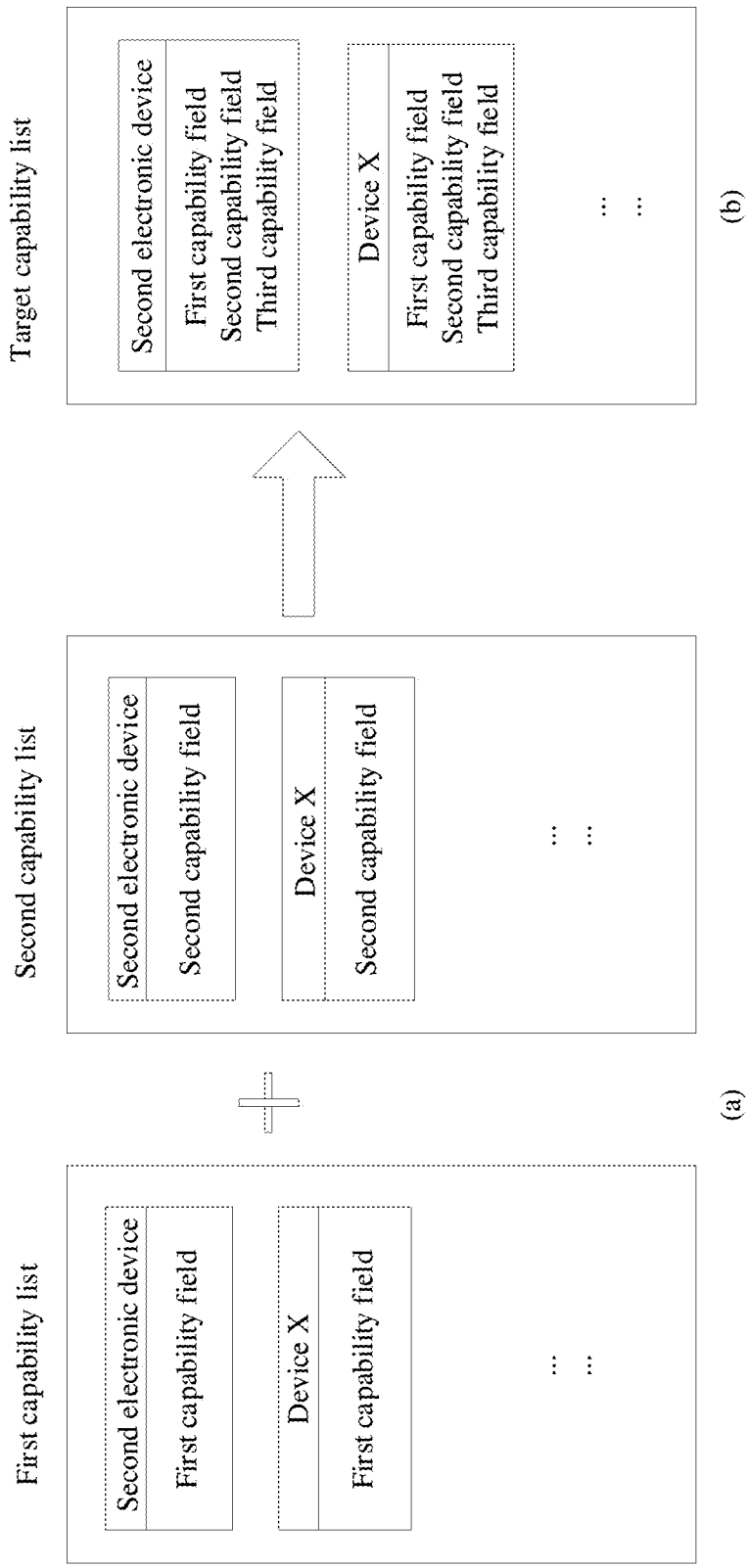
FIG. 7 is a schematic diagram of a target capability list according to an embodiment of this application.

The first capability field and the second capability field are respectively included in the first capability list and the second capability list, and the device identity can uniquely identify identity information of the second electronic device. Therefore, the first electronic device determines whether the device identity in the first capability field matches the device identity in the second capability field, and when the device identity in the first capability field matches the device identity in the second capability field, adds the second capability field and the third capability field to the first capability list, to obtain the target capability list of the second electronic device. FIG. 7 is a schematic diagram of a target capability list according to an embodiment of this application. As shown in FIG. 7, a part (a) shows the first capability list and the second capability list. The first capability list includes devices that can support the first projection protocol by using the first capability field, for example, the second electronic device and a device X. The second capability list includes devices that can support the second projection protocol by using the second capability field, for example, the second electronic device and the device X. A part (b) shows the target capability list that is of the second electronic device and that is obtained through combination. It may be learned from the part (b) that the target capability list of the second electronic device includes the first capability field, the second capability field, and the third capability field.

(2) The first electronic device determines a first capability list and/or a second capability list, and when the device identity in the first capability field is the same as the device identity in the second capability field, adds the first capability field and the third capability field to the second capability list, to obtain the target capability list of the second electronic device.

That is, this is understood as: When the device identity in the first capability field matches the second identity in the second capability field, the first electronic device may also add the first capability field and the third capability field to the second capability list, to obtain the target capability list of the second electronic device. For details, refer to the content shown in FIG. 7 for understanding. Details are not described herein again.

S03: The first electronic device generates the first identity, where the first identity is related to a target capability list of the second electronic device.

In this example, the target capability list includes all the first capability field, the second capability field, and the third capability field. In this case, after determining the target capability list, the first electronic device only needs to generate the first identity corresponding to the target capability list of the second electronic device, and does not need to generate a projection identity corresponding to the first capability list and a projection identity corresponding to the second capability list.

It should be noted that the described first identity may be understood with reference to the content in step 303. Details are not described herein again.

In this embodiment of this application, the first electronic device only needs to display, in a same row or a same column on the display interface, the first identity related to the single second electronic device, and does not need to separately display, in a plurality of rows or a plurality of columns, different controls that are of the same second electronic device and that are used to trigger projection by using different protocols, to present the first identity of the single second electronic device to the user. Therefore, the user does not need to be confused about which identity should be selected for projection when selecting the second electronic device for projection on the display interface of the first electronic device.

Figure 8:
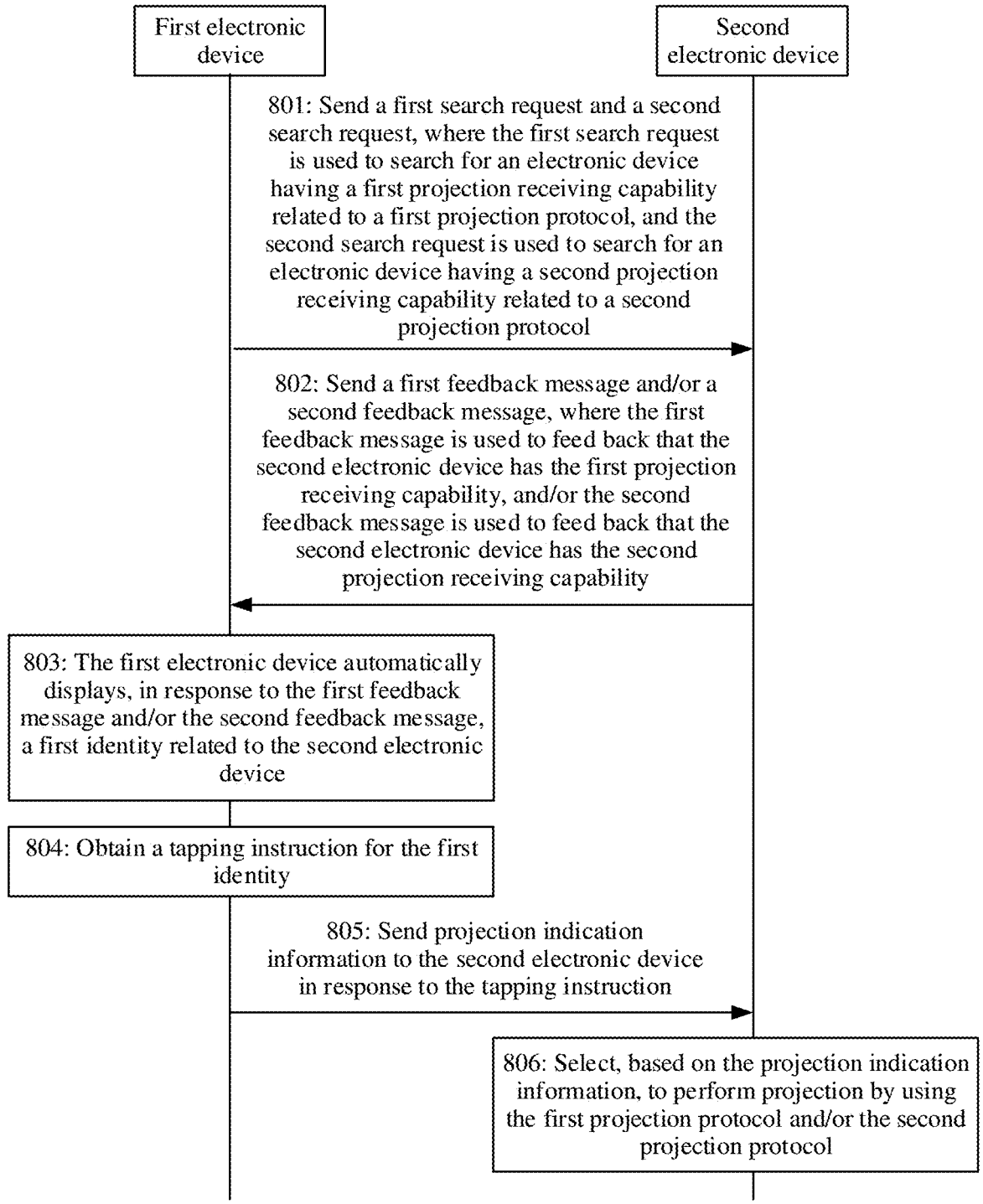
FIG. 8 is a schematic flowchart of another projection processing method according to an embodiment of this application.

For ease of understanding, FIG. 8 shows another projection processing method according to an embodiment of this application. As shown in FIG. 8, the projection processing method may include the following steps.

Steps 801 to 803 are respectively the same as steps 301 to 303 in FIG. 3. For details, refer to the content described in steps 301 to 303 in FIG. 3 for understanding. Details are not described herein again.

804: The first electronic device obtains a tapping instruction for the first identity.

In this example, when a user needs to display projection data in the first electronic device on the second electronic device, the user may tap the first identity on a display interface of the first electronic device. In this way, the first electronic device may obtain the tapping instruction for the first identity. It should be noted that the first electronic device may obtain the tapping instruction for the first identity by using different types of projection ports. For example, the projection ports include a system port or an application port. It should be understood that, in addition to the system port and the application port, the projection ports may further include another type of port during actual application. This is not limited herein.

805: The first electronic device sends projection indication information to the second electronic device in response to the tapping instruction.

In this example, for different projection ports, the second electronic device may quickly respond to a projection operation by using different projection protocols. Therefore, after obtaining the tapping instruction for the first identity, the first electronic device sends the projection indication information to the second electronic device in response to the tapping instruction. It should be noted that the projection indication information may reflect a type of projection port used by the first electronic device to obtain the tapping instruction.

806: The second electronic device selects, based on the projection indication information, to perform projection by using the first projection protocol and/or the second projection protocol.

In this example, in different projection scenarios, the second electronic device may select, based on the projection indication information, to perform projection by using the first projection protocol and/or the second projection protocol.

For example, when the first electronic device obtains the tapping instruction for the first identity by using the system port, if the second electronic device does not have the second projection receiving capability related to supporting the second projection protocol but has only the first projection receiving capability related to supporting the first projection protocol, after receiving first information, the second electronic device may directly select, based on the first information, to perform projection by using the first projection protocol. When the second projection protocol cannot be used for projection, the first projection protocol can be automatically and directly used to complete projection. This reduces a step in which the user switches the projection port and attempts to perform projection again, reduces complexity of a user operation, and improves ease of use of projection.

It should be noted that the projection indication information includes the first information. In addition, the first information indicates that the first electronic device obtains the tapping instruction for the first identity by using the system port.

In addition, when the first electronic device obtains the tapping instruction for the first identity by using the application port, the second electronic device may alternatively select, based on second information, to perform projection by using the first projection protocol, or select, based on second information, to perform projection by using the second projection protocol. It should be understood that the projection indication information includes the second information. In addition, the second information indicates that the first electronic device obtains the tapping instruction for the first identity by using the application port.

It should be noted that, that the second electronic device selects, based on the second information, to perform projection by using the first projection protocol, or selects, based on the second information, to perform projection by using the second projection protocol may be understood in the following two cases.

(1) If the second electronic device does not have the second projection receiving capability but has only the first projection receiving capability, after receiving the second information, the second electronic device may directly select, based on the second information, to perform projection by using the first projection protocol. When the second projection protocol cannot be used for projection, the first projection protocol can be automatically and directly used to complete projection. This reduces a step in which the user switches the projection port and attempts to perform projection again, reduces complexity of a user operation, and improves ease of use of projection.

(2) If the second electronic device has both the first projection receiving capability and the second projection receiving capability, and if a projection level of the first projection protocol is lower than a projection level of the second projection protocol, after receiving the second information, the second electronic device may select, based on the second information, to perform projection by using the second projection protocol. Alternatively, when the projection level of the first projection protocol is higher than the projection level of the second projection protocol, after receiving the second information, the second electronic device may select, based on the second information, to perform projection by using the first projection protocol. In a scenario in which projection can be completed by using both the first projection protocol and the second projection protocol, projection is completed by using a projection protocol with a higher projection level, so that projection efficiency is greatly improved.

Figure 9:
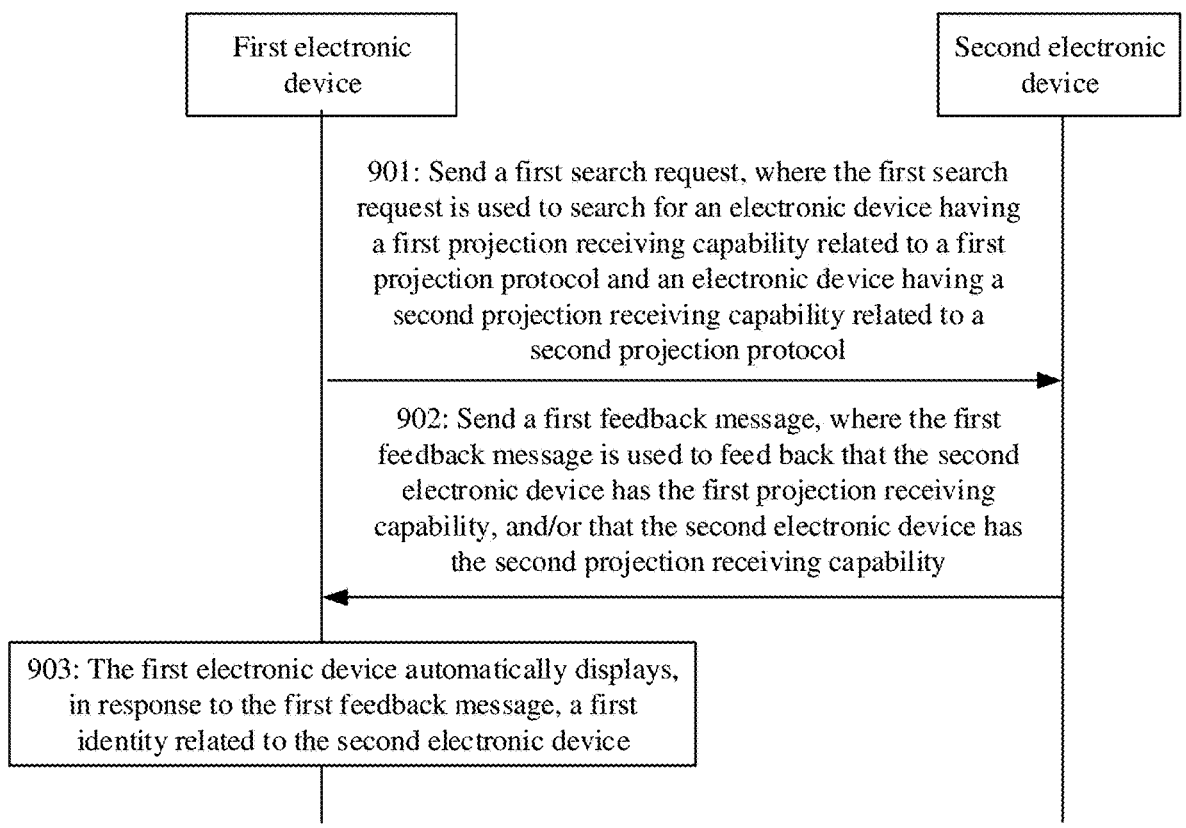
FIG. 9 is a schematic flowchart of another projection processing method according to an embodiment of this application.

In FIG. 3 to FIG. 8, the electronic device having the first projection receiving capability related to the first projection protocol and the electronic device having the second projection receiving capability related to the second projection protocol are respectively found from perspectives of the two search requests: the first search request and the second search request. The following searches, from a perspective of one search request, for the electronic device having the first projection receiving capability related to the first projection protocol and the electronic device having the second projection receiving capability related to the second projection protocol. FIG. 9 is a schematic flowchart of another projection processing method according to an embodiment of this application. It may be learned from FIG. 9 that the projection processing method may include the following steps.

901: A first electronic device sends a first search request, where the first search request is used to search for an electronic device having a first projection receiving capability related to a first projection protocol and an electronic device having a second projection receiving capability related to a second projection protocol.

In this example, the first search request may be used to search for both the electronic device having the first projection receiving capability related to the first projection protocol and the electronic device having the second projection receiving capability related to the second projection protocol. For details, refer to the first search request and the second search request in step 301 in FIG. 3 for understanding. Details are not described herein again.

902: A second electronic device sends a first feedback message to the first electronic device, where the first feedback message is used to feed back that the second electronic device has the first projection receiving capability, and/or that the second electronic device has the second projection receiving capability.

In this example, after receiving the first search request, if the second electronic device has the first projection receiving capability and/or the second projection receiving capability, the second electronic device may feed back the first feedback message to the first electronic device. For details, refer to step 302 in FIG. 3 for understanding. Details are not described herein again.

In some possible examples, the first electronic device may receive, within preset duration, the first feedback message and/or a second feedback message from the second electronic device. It should be noted that a specific value of the preset duration is not limited in embodiments of this application.

In some possible examples, the first feedback message includes a first capability field that is used by the second electronic device to support projection by using the first projection protocol, and/or includes a second capability field that is used by the second electronic device to support projection by using the second projection protocol. It should be noted that the first capability field may be understood with reference to Table 1 in FIG. 3, and that the second capability field may be understood with reference to Table 2 in FIG. 3. Details are not described herein again.

In some possible examples, before performing step 902, the second electronic device extends a first type identity and a device identity in the first capability field, and extends a second type identity and a device identity in the second capability field. The first type identity and the second type identity identify a device type of the second electronic device. It should be noted that a manner of extending the first type identity and the device identity by the second electronic device may be understood with reference to the manner in FIG. 4. Details are not described herein again. In addition, a manner of extending the second type identity and the device identity by the second electronic device may also be understood with reference to step 302 in FIG. 3. Details are not described herein again.

903: The first electronic device automatically displays, in response to the first feedback message, a first identity related to the second electronic device.

In this example, the first identity may include the device identity of the second electronic device, and further include at least one of a first control used to trigger projection to the second electronic device by using the first projection protocol and a second control used to trigger projection to the second electronic device by using the second projection protocol.

When the first electronic device receives the first feedback message sent by the second electronic device, different first identities may be displayed. The following describes in detail based on three different cases.

① When the first feedback message is used to feed back that the second electronic device has the first projection receiving capability and the second projection receiving capability, the first identity includes a device identity of the second electronic device, a first control used to trigger projection to the second electronic device by using the first projection protocol, and a second control used to trigger projection to the second electronic device by using the second projection protocol, and the device identity, the first control, and the second control are displayed in a same row or a same column. It should be understood that, for details of the case ① herein, refer to FIG. 5A and the case ① in step 303 in FIG. 3 for understanding. Details are not described herein again.

② When the first feedback message is used to feed back that the second electronic device has the first projection receiving capability, the first identity includes a device identity of the second electronic device and a first control used to trigger projection to the second electronic device by using the first projection protocol, and the device identity and the first control are displayed in a same row or a same column. It should be understood that, for details of the case ② herein, refer to FIG. 5B and the case ② in step 303 in FIG. 3 for understanding. Details are not described herein again.

For example, the case ② may be further understood as a case in which the first feedback message is used to feed back that the second electronic device has the first projection receiving capability but does not have the second projection receiving capability. In this case, the first identity includes only the device identity of the second electronic device and the first control, and the device identity and the first control are in a same row or a same column.

③ When the first feedback message is used to feed back that the second electronic device has the second projection receiving capability, the first identity includes a device identity of the second electronic device and a second control used to trigger projection to the second electronic device by using the second projection protocol, and the device identity and the second control are displayed in a same row or a same column. It should be understood that, for details of the case ③ herein, refer to FIG. 5C and the case ③ in step 303 in FIG. 3 for understanding. Details are not described herein again.

For example, the case ③ may be further understood as a case in which the first feedback message is used to feed back that the second electronic device does not have the first projection receiving capability and that the second electronic device has the second projection receiving capability. In this case, the first identity includes only the device identity of the second electronic device and the second control, and the device identity and the second control are in a same row or a same column.

For example, in some other possible implementations, when the first feedback message is used to feed back that the second electronic device does not have the first projection receiving capability and that the second electronic device does not have the second projection receiving capability, the first identity may alternatively include only the device identity of the second electronic device.

For example, in some other possible implementations, before performing step 903, the first electronic device may further perform the following steps: determining a third capability field after the second electronic device is determined as an integrated projection device based on the first type identity and/or the second type identity, where the third capability field indicates that the second electronic device supports projection by using the first projection protocol and the second projection protocol; and then determining a target capability list of the second electronic device based on the third capability field, the first capability field, and the second capability field, and generating the first identity, where the first identity is related to the target capability list of the second electronic device. For details, refer to the content in steps S01 to S03 in FIG. 3 for understanding. Details are not described herein again.

For example, in some other possible implementations, the first electronic device may determine the third capability field in the following manner: The first electronic device determines a protocol priority capability field, where the protocol priority capability field includes a projection level of the first projection protocol and a projection level of the second projection protocol. Then, the first electronic device determines the third capability field based on the first capability field, the second capability field, and the protocol priority capability field. For details, refer to the content in step S01 in FIG. 3 for understanding. Details are not described herein again.

For example, in some other possible implementations, the first electronic device may determine the target capability list of the second electronic device based on the third capability field, the first capability field, and the second capability field in the following manner: The first electronic device determines a first capability list and/or a second capability list, where the first capability list includes the first capability field, and the second capability list includes the second capability field. Then, when the device identity in the first capability field is the same as the device identity in the second capability field, the first electronic device adds the second capability field and the third capability field to the first capability list, to obtain the target capability list of the second electronic device; or when the device identity in the first capability field is the same as the device identity in the second capability field, the first electronic device adds the first capability field and the third priority capability field to the second capability list, to obtain the target capability list of the second electronic device. For details, refer to the content in step S02 in FIG. 3 for understanding. Details are not described herein again.

Figure 10:
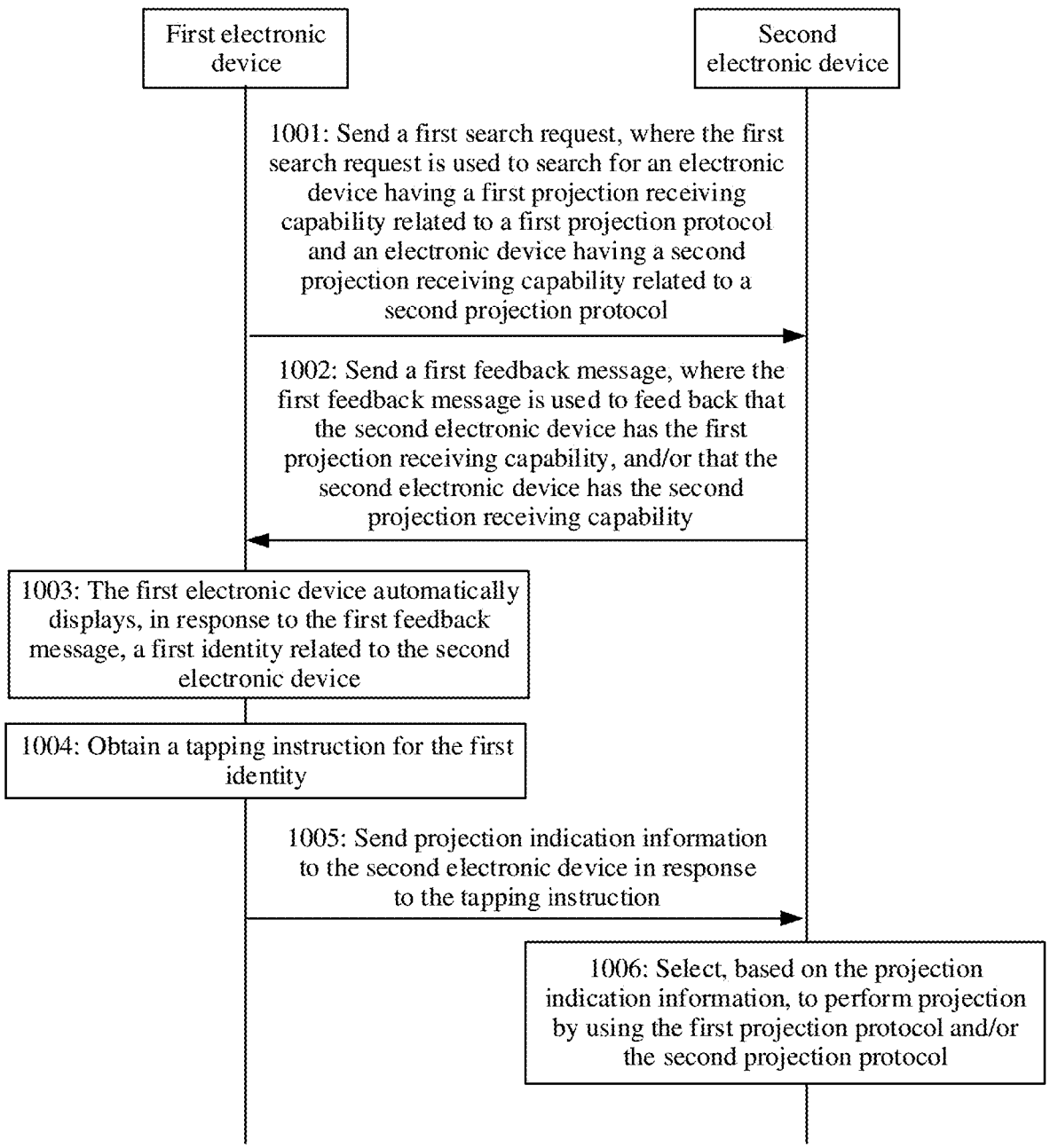
FIG. 10 is a schematic flowchart of another projection processing method according to an embodiment of this application.

For ease of understanding, FIG. 10 shows another projection processing method according to an embodiment of this application. As shown in FIG. 10, the projection processing method may include the following steps.

Steps 1001 to 1003 are respectively the same as steps 901 to 903 in FIG. 9. For details, refer to the content described in steps 901 to 903 in FIG. 9 for understanding. Details are not described herein again.

Steps 1004 to 1006 are respectively the same as steps 804 to 806 in FIG. 8. For details, refer to the content described in steps 804 to 806 in FIG. 8 for understanding. Details are not described herein again.

The foregoing mainly describes the solutions provided in embodiments of this application from a perspective of method interaction. It may be understood that, to implement the foregoing functions, the first electronic device and the second electronic device each include corresponding hardware structures and/or software modules for performing the functions. A person skilled in the art should be easily aware that, in combination with the functions described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of an entity device, the first electronic device and the second electronic device may be specifically implemented by one entity device, or may be jointly implemented by a plurality of entity devices, or may be a logical functional unit in one entity device. This is not specifically limited in embodiments of this application.

Figure 11:
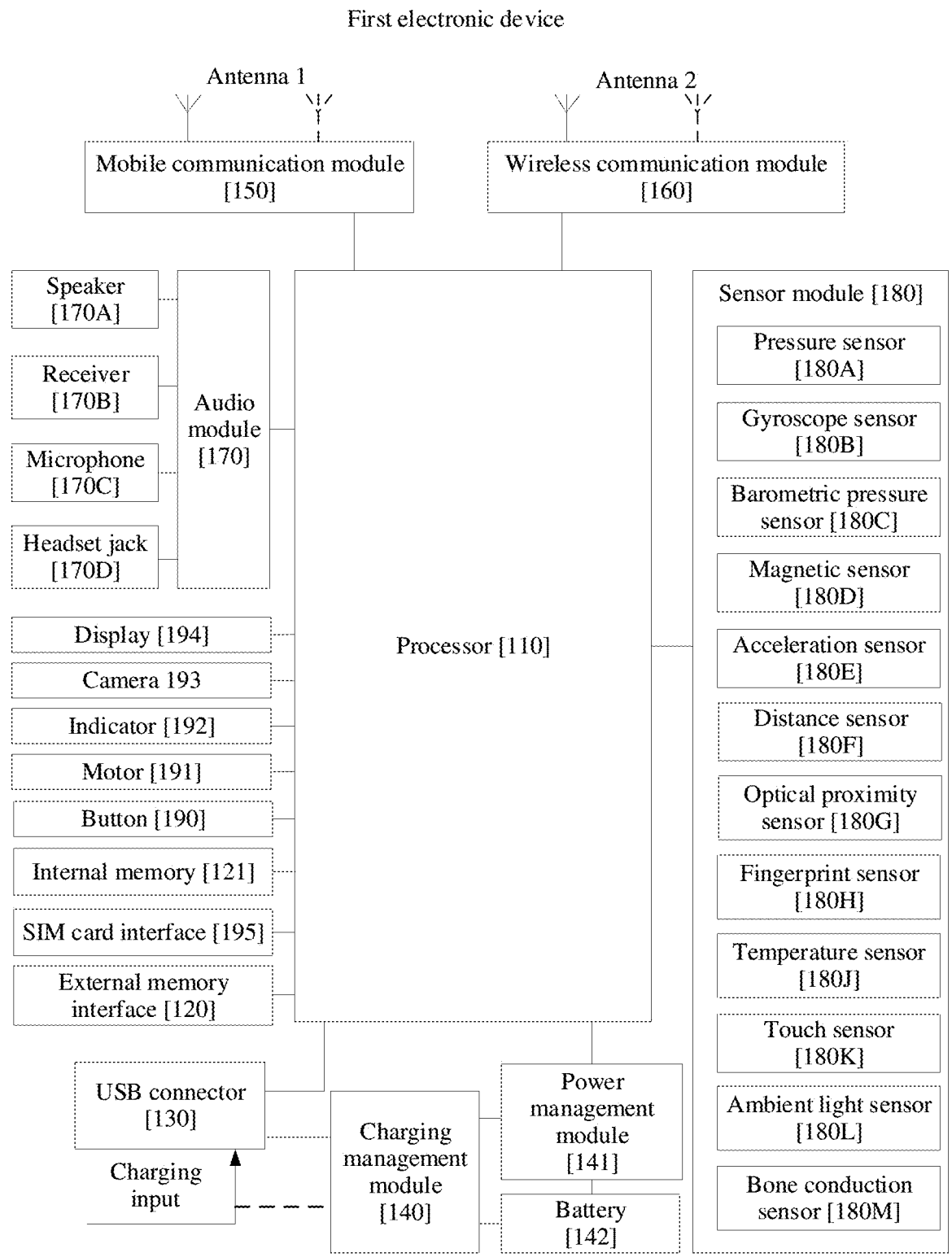
FIG. 11 is a schematic diagram of a hardware structure of a first electronic device according to an embodiment of this application.

For example, FIG. 11 is a schematic diagram of a hardware structure of a first electronic device according to an embodiment of this application.

The first electronic device may include at least one of a mobile phone, a foldable electronic device, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, or a smart city device. A specific type of the first electronic device is not specially limited in embodiments of this application.

The first electronic device may include a processor 110, an external memory interface 120, an internal memory 121, a universal serial bus (universal serial bus, USB) connector 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the first electronic device. In some other embodiments of this application, the first electronic device may include more or fewer components than those shown in the figure, or combine some components, or split some components, or have a different component arrangement. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The processor 110 may generate an operation control signal based on instruction operation code and a time sequence signal, to complete control of instruction reading and instruction execution.

A memory may be further disposed in the processor 110, and is configured to store instructions and data. In some embodiments, the memory in the processor 110 may be a cache memory. The memory may store instructions or data that are/is used by the processor 110 or that are/is used frequently. If the processor 110 needs to use the instructions or data, the processor 110 may directly invoke the instructions or data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. The processor 110 may be connected to a module such as a touch sensor, an audio module, a wireless communication module, a display, and a camera through at least one of the foregoing interfaces.

It may be understood that, an interface connection relationship between the modules shown in this embodiment of this application is merely an example for description, and does not constitute a limitation on the structure of the first electronic device. In some other embodiments of this application, the first electronic device may alternatively use an interface connection manner different from that in the foregoing embodiment, or a combination of a plurality of interface connection manners.

The USB connector 130 is an interface that conforms to a USB standard specification, may be configured to connect the first electronic device and a peripheral device, and may be specifically a mini USB connector, a micro USB connector, a USB Type C connector, or the like. The USB connector 130 may be configured to connect to a charger, to charge the first electronic device by the charger, or may be configured to connect to another electronic device, to implement data transmission between the first electronic device and the another electronic device. The USB connector 130 may alternatively be configured to connect to a headset, to output, through the headset, audio stored in the electronic device. The connector may be further configured to connect to another electronic device, for example, a VR device. In some embodiments, a standard specification of the universal serial bus may be USB1.x, USB2.0, USB3.x, and USB4.

The charging management module 140 is configured to receive a charging input of the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the first electronic device. The charging management module 140 may also supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the first electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the first electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that includes wireless communication such as 2G/3G/4G/5G and that is applied to the first electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the first electronic device and that includes a wireless local area network (wireless local area network, WLAN) (for example, a wireless fidelity (wireless fidelity, Wi-Fi) network), Bluetooth (Bluetooth, BT), Bluetooth low energy (Bluetooth low energy, BLE), an ultra wideband (ultra wideband, UWB), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more devices integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the first electronic device, the antenna 1 and the mobile communication module 150 are coupled, and the antenna 2 and the wireless communication module 160 are coupled, so that the first electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (Time Division-Synchronous Code Division Multiple Access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The first electronic device can implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light-emitting diode, QLED), or the like. In some embodiments, the first electronic device may include one or more displays 194.

The first electronic device may implement an image shooting function by using the image shooting module 193, the ISP, the video codec, the GPU, the display 194, the application processor AP, the neural-network processing unit NPU, and the like.

The image shooting module 193 may be configured to collect color image data and depth data of a photographed object. The ISP may be configured to process the color image data collected by the image shooting module 193. For example, during shooting, a shutter is pressed, and light is transmitted to a photosensitive element of the camera through a lens. An optical signal is converted into an electrical signal. The photosensitive element of the camera transmits the electrical signal to the ISP for processing, to convert the electrical signal into an image visible a naked eye. The ISP may further perform algorithm optimization on noise and brightness of the image. The ISP may further optimize parameters such as exposure and a color temperature of a shooting scene. In some embodiments, the ISP may be disposed in the image shooting module 193.

In some embodiments, the image shooting module 193 may include a color image shooting module and a 3D sensing module.

In some embodiments, a photosensitive element of a camera of the color image shooting module may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV.

In some embodiments, the 3D sensing module may be a (time of flight, TOF) 3D sensing module or a structured light (structured light) 3D sensing module. Structured light 3D sensing is an active depth sensing technology. Basic components of the structured light 3D sensing module may include an infrared (Infrared) transmitter, an IR camera module, and the like. A working principle of the structured light 3D sensing module is to first emit light spots of a specific pattern (pattern) to a photographed object, then receive light spot pattern coding (light coding) on a surface of the object, further compare similarities and differences with the original projected light spots, and calculate three-dimensional coordinates of the object according to a triangulation principle. The three-dimensional coordinates include a distance between the first electronic device and the photographed object. TOF 3D sensing may be an active depth sensing technology. Basic components of the TOF 3D sensing module may include an infrared (Infrared) transmitter, an IR camera module, and the like. A working principle of the TOF 3D sensing module is to calculate a distance (that is, a depth) between the TOF 3D sensing module and a photographed object by using an infrared turn-back time, to obtain a 3D depth-of-field image.

The structured light 3D sensing module may be further used in fields such as facial recognition, a motion sensing game console, industrial machine vision detection, and the like. The TOF 3D sensing module may be further used in fields such as a game console, augmented reality (augmented reality, AR)/virtual reality (virtual reality, VR), and the like.

In some other embodiments, the image shooting module 193 may further include two or more cameras. The two or more cameras may include a color camera. The color camera may be configured to collect color image data of the photographed object. The two or more cameras may collect depth data of the photographed object by using a stereo vision (stereo vision) technology. The stereo vision technology is based on a principle of a parallax of human eyes. Under a natural light source, two or more cameras are used to shoot an image of a same object from different angles, and then an operation such as a triangulation method is performed to obtain distance information, that is, depth information, between the first electronic device and the photographed object.

In some embodiments, the first electronic device may include one or more image shooting modules 193. For example, the first electronic device may include one front-facing image shooting module 193 and one rear-facing image shooting module 193. The front-facing image shooting module 193 may be usually configured to collect color image data and depth data of a photographer facing the display 194. The rear-facing image shooting module may be configured to collect color image data and depth data of a photographed object (such as a person or a scenery) facing the photographer.

In some embodiments, a CPU in the processor 110 may be configured to automatically display, in response to a first feedback message and/or a second feedback message, a first identity related to a second electronic device, and the like. The first identity may be understood with reference to the content in FIG. 3 to FIG. 10. Details are not described herein again.

The digital signal processor is configured to process a digital signal, and may further process another digital signal. For example, when the first electronic device selects a frequency, the digital signal processor is configured to perform Fourier transform or the like on frequency energy.

The video codec is configured to compress or decompress a digital video. The first electronic device may support one or more types of video codecs. Therefore, the first electronic device may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transmission mode between human brain neurons, and may further continuously perform self-learning. The NPU can implement applications such as intelligent cognition of the first electronic device, for example, image recognition, facial recognition, voice recognition, and text understanding.

The external memory interface 120 may be configured to connect to an external memory card, for example, a micro SD card, to extend a storage capability of the first electronic device. The external memory card communicates with the processor 110 through the external memory interface 120, to implement a data storage function. For example, files such as music and videos are stored in the external memory card. Alternatively, files such as music and videos are transmitted from the electronic device to the external memory card.

The internal memory 121 may be configured to store computer-executable program code. The executable program code includes instructions. The internal memory 121 may include a program storage area and a data storage area. The program storage area may store an operating system, an application required by at least one function (such as a sound playing function or an image playing function), and the like. The data storage area may store data (such as audio data or a phone book) created based on use of the first electronic device, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121, and/or the instructions stored in the memory disposed in the processor, to perform various function methods of the first electronic device or data processing.

The first electronic device may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The first electronic device may listen to music or output an audio signal of a hands-free call by using the speaker 170A.

The receiver 170B, also referred to as an "earpiece", is configured to convert an electrical audio signal into a sound signal. When a call is answered or a voice message is listened to by using the first electronic device, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the first electronic device. In some other embodiments, two microphones 170C may be disposed in the first electronic device, to collect a sound signal and further implement a noise reduction function. In some other embodiments, three, four, or more microphones 170C may alternatively be disposed in the first electronic device, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, a capacitive pressure sensor, and the like. The capacitive pressure sensor may include at least two parallel plates made of conductive materials. When a force is applied to the pressure sensor 180A, capacitance between electrodes changes. The first electronic device determines pressure intensity based on a capacitance change. When a touch operation is performed on the display 194, the first electronic device detects intensity of the touch operation by using the pressure sensor 180A. The first electronic device may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyroscope sensor 180B may be configured to determine a motion posture of the first electronic device. In some embodiments, angular velocities of the first electronic device around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the first electronic device jitters, calculates, based on the angle, a distance for which a lens module needs to compensate, and controls reverse motion of the lens to cancel the jitter of the first electronic device, to implement image stabilization. The gyroscope sensor 180B may further be used in a navigation scenario and a motion sensing game scenario.

The barometric pressure sensor 180C is configured to measure barometric pressure. In some embodiments, the first electronic device calculates an altitude based on a value of the barometric pressure measured by the barometric pressure sensor 180C, to assist in positioning and navigation.

The magnetic sensor 180D includes a Hall sensor. The first electronic device may detect opening and closing of a flip leather case by using the magnetic sensor 180D. When the first electronic device is a foldable electronic device, the magnetic sensor 180D may be configured to detect folding or unfolding, or a folding angle of the electronic device. In some embodiments, when the first electronic device is a flip phone, the first electronic device may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitudes of accelerations of the first electronic device in all directions (usually on three axes). When the first electronic device is still, a magnitude and a direction of gravity can be detected. The acceleration sensor 180E may be further configured to identify a posture of the first electronic device, and is used in an application such as switching between a landscape mode and a portrait mode or a pedometer.

The distance sensor 180F is configured to measure a distance. The first electronic device may measure the distance through infrared or laser. In some embodiments, in a shooting scene, the first electronic device may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The first electronic device emits infrared light to the outside by using the light emitting diode. The first electronic device detects reflected infrared light from a nearby object by using the photodiode. When intensity of the detected reflected light is greater than a threshold, it may be determined that there is an object near the first electronic device. When intensity of the detected reflected light is less than the threshold, the first electronic device may determine that there is no object near the first electronic device. The first electronic device may detect, by using the optical proximity sensor 180G, that the user holds the first electronic device close to an ear for a call, to automatically turn off a screen for power saving. The optical proximity sensor 180G may alternatively be used in a leather case mode or a pocket mode to automatically unlock or lock a screen.

The ambient light sensor 180L may be configured to sense ambient light brightness. The first electronic device may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G to detect whether the first electronic device is blocked, for example, the electronic device is in a pocket. When it is detected that the first electronic device is blocked or in a pocket, some functions (for example, a touch function) may be disabled to prevent a misoperation.

The fingerprint sensor 180H is configured to collect a fingerprint. The first electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the first electronic device executes a temperature processing policy based on the temperature detected by the temperature sensor 180J. For example, when the temperature detected by the temperature sensor 180J exceeds a threshold, the first electronic device degrades performance of the processor, to reduce power consumption of the electronic device to implement thermal protection. In some other embodiments, when the temperature detected by the temperature sensor 180J is less than another threshold, the first electronic device heats the battery 142. In some other embodiments, when the temperature is less than still another threshold, the first electronic device may boost an output voltage of the battery 142.

The touch sensor 180K is also referred to as a "touch device". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of the touch event. A visual output related to the touch operation may be provided on the display 194. In some other embodiments, the touch sensor 180K may be alternatively disposed on a surface of the first electronic device at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to be combined into a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 may include a power button, a volume button, and the like. The button 190 may be a mechanical button, or may be a touch button. The first electronic device may receive a button input, and generate a button signal input related to user settings and function control of the first electronic device.

The motor 191 may generate a vibration prompt. The motor 191 may be configured to provide an incoming call vibration prompt or a touch vibration feedback. For example, touch operations performed on different applications (for example, a photographing application and an audio playing application) may correspond to different vibration feedback effect. The motor 191 may also correspond to different vibration feedback effect for touch operations performed on different areas of the display 194. Different application scenarios (for example, a time reminder, information receiving, an alarm clock, and a game) may also correspond to different vibration feedback effect. The touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the first electronic device. The first electronic device may support one or more SIM card interfaces. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may be compatible with different types of SIM cards. The SIM card interface 195 may also be compatible with an external memory card. The first electronic device interacts with a network through the SIM card, to implement functions such as calling and data communication. In some embodiments, the first electronic device uses an eSIM, namely, an embedded SIM card. The eSIM card may be embedded into the first electronic device, and cannot be separated from the first electronic device.

Figure 12:
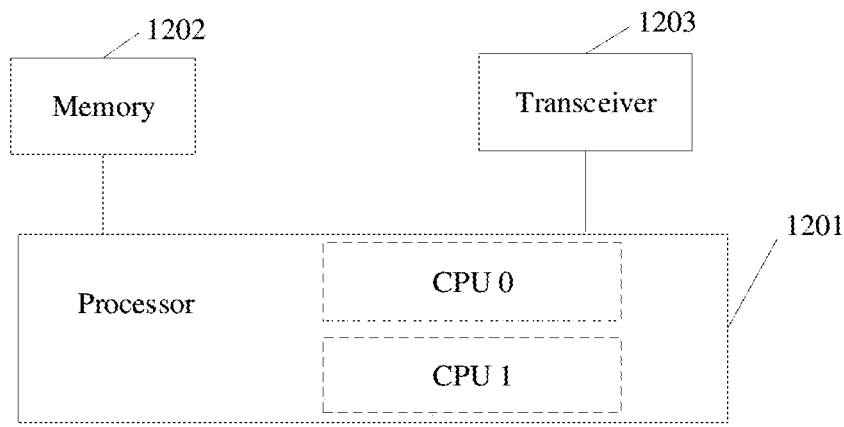
FIG. 12 is a schematic diagram of a hardware structure of a first electronic device according to an embodiment of this application.

The foregoing mainly describes the first electronic device from the perspective of the entity device. The following describes the second electronic device from the perspective of the entity device. FIG. 12 is a schematic diagram of a hardware structure of a second electronic device according to an embodiment of this application. The second electronic device may include a large-screen display device such as a television or a curtain.

The second electronic device includes at least one processor 1201, a memory 1202, a transceiver 1203, and a computer program.

The computer program may be a series of program code, computer-executable instructions, or the like, and is mainly stored in the memory 1202.

The processor 1201 may be a general-purpose central processing unit CPU, a microprocessor, an application-specific integrated circuit (application-specific integrated circuit), or one or more integrated circuits configured to control program execution of the solutions in this application. The processor 1201 can perform operations such as determining, analysis, operation, and the like, and is mainly configured to execute the computer program. In this way, when the computer program is executed by the processor 1201, the second electronic device is enabled to perform the steps or operations performed by the second electronic device in FIG. 3 to FIG. 10.

For example, when the computer program is executed by the processor 1201, the second electronic device is enabled to perform the following operations: receiving a first search request and a second search request that are sent by a first electronic device, where the first search request is used to search for an electronic device having a first projection receiving capability related to a first projection protocol, and the second search request is used to search for an electronic device having a second projection receiving capability related to a second projection protocol; and sending a first feedback message and a second feedback message to the first electronic device, where the first feedback message is used to feed back that the second electronic device has the first projection receiving capability, and/or the second feedback message is used to feed back that the second electronic device has the second projection receiving capability.

For example, when the computer program is executed by the processor 1201, the second electronic device is enabled to perform the following operations: receiving a first search request sent by a first electronic device, where the first search request is used to search for an electronic device having a first projection receiving capability related to a first projection protocol and an electronic device having a second projection receiving capability related to a second projection protocol; and sending a first feedback message to the first electronic device, where the first feedback message is used to feed back that the second electronic device has the first projection receiving capability and/or that the second electronic device has the second projection receiving capability.

The memory 1202 may also be understood with reference to the internal memory 121 or the like in FIG. 11. Details are not described herein again.

From a perspective of a functional unit, in this application, the first electronic device and the second electronic device may be divided into functional units based on the foregoing method embodiments. For example, each functional unit may be obtained through division based on each corresponding function, or two or more functions may be integrated into one functional unit. The integrated functional unit may be implemented in a form of hardware, or may be implemented in a form of a software functional unit.

Figure 13:
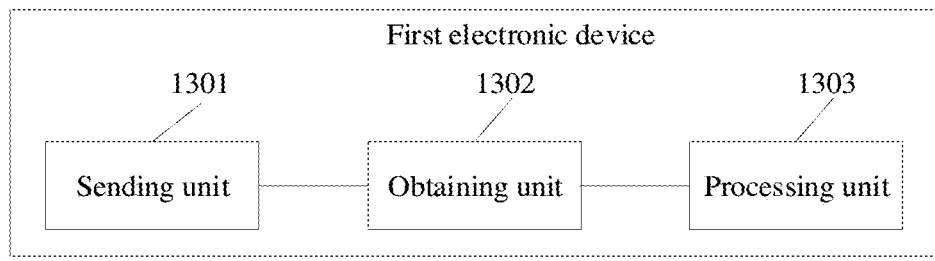
FIG. 13 is a schematic diagram of a structure of a first electronic device according to an embodiment of this application.

For example, when the functional units are obtained through division in an integrated manner, FIG. 13 is a schematic diagram of a structure of a first electronic device according to an embodiment of this application. As shown in FIG. 13, an embodiment of the first electronic device in this application may include a sending unit 1301, an obtaining unit 1302, and a processing unit 1303.

The sending unit 1301 is configured to automatically send a first search request and a second search request. The first search request is used to search for an electronic device having a first projection receiving capability related to a first projection protocol. The second search request is used to search for an electronic device having a second projection receiving capability related to a second projection protocol. For a specific implementation, refer to the detailed descriptions of step 301 in FIG. 3 and step 801 in FIG. 8. Details are not described herein again.

The obtaining unit 1302 is configured to receive a first feedback message and/or a second feedback message from a second electronic device. The first feedback message is used to feed back that the second electronic device has the first projection receiving capability, and/or the second feedback message is used to feed back that the second electronic device has the second projection receiving capability. For a specific implementation, refer to the detailed descriptions of step 302 in FIG. 3 and step 802 in FIG. 8. Details are not described herein again.

The processing unit 1303 is configured to automatically display, in response to the first feedback message and/or the second feedback message, a first identity related to the second electronic device. It should be noted that the first identity may be understood with reference to the content in FIG. 3 to FIG. 8. Details are not described herein again. For a specific implementation, refer to the detailed descriptions of step 303 in FIG. 3 and step 803 in FIG. 8. Details are not described herein again.

In some possible examples, the obtaining unit 1302 is configured to receive, within preset duration, the first feedback message and/or the second feedback message from the second electronic device.

In some possible examples, before automatically displaying the first identity related to the second electronic device, the processing unit 1303 is configured to determine a third capability field after the second electronic device is determined, based on a first type identity and/or a second type identity, as an integrated projection device. The third capability field indicates that the second electronic device supports projection by using the first projection protocol and the second projection protocol. In addition, the processing unit further determines a target capability list of the second electronic device based on the third capability field, a first capability field, and a second capability field, and generates the first identity. The first identity is related to the target capability list of the second electronic device.

In some other possible examples, the processing unit 1303 is configured to: determine a protocol priority capability field, where the protocol priority capability field includes a projection level of the first projection protocol and a projection level of the second projection protocol; and determine the third capability field based on the first capability field, the second capability field, and the protocol priority capability field.

For example, in some implementations, the processing unit 1303 is configured to determine a first capability list and/or a second capability list, where the first capability list includes the first capability field, and the second capability list includes the second capability field. In addition, the processing unit 1303 is configured to: when a device identity in the first capability field is the same as a device identity in the second capability field, add the second capability field and the third capability field to the first capability list, to obtain the target capability list of the second electronic device; or when a device identity in the first capability field is the same as a device identity in the second capability field, add the first capability field and the third priority capability field to the second capability list, to obtain the target capability list of the second electronic device.

For example, in some implementations, the obtaining unit 1302 is further configured to obtain a tapping instruction for the first identity. The processing unit 1303 is further configured to send projection indication information to the second electronic device in response to the tapping instruction. The projection indication information indicates the second electronic device to select to perform projection by using the first projection protocol and/or the second projection protocol.

The foregoing mainly describes the first electronic device from the perspective of the functional module. In some other possible implementations, the sending unit 1301, the obtaining unit 1302, and the processing unit 1303 in the first electronic device may alternatively be configured to perform the following functions.

The sending unit 1301 is configured to automatically send a first search request. The first search request is used to search for an electronic device having a first projection receiving capability related to a first projection protocol and an electronic device having a second projection receiving capability related to a second projection protocol.

The obtaining unit 1302 is configured to receive a first feedback message from a second electronic device. The first feedback message is used to feed back that the second electronic device has the first projection receiving capability, and/or that the second electronic device has the second projection receiving capability.

The processing unit 1303 is configured to automatically display, in response to the first feedback message, a first identity related to the second electronic device. It should be noted that the first identity herein may be understood with reference to the first identity described in FIG. 9 and FIG. 10. Details are not described herein again.

For example, in some implementations, the obtaining unit 1302 is configured to receive, within preset duration, the first feedback message from the second electronic device.

For example, in some implementations, before automatically displaying the first identity related to the second electronic device, the processing unit 1303 is further configured to determine a third capability field after the second electronic device is determined, based on a first type identity and/or a second type identity, as an integrated projection device. The third capability field indicates that the second electronic device supports projection by using the first projection protocol and the second projection protocol. In addition, the processing unit 1303 further determines a target capability list of the second electronic device based on the third capability field, a first capability field, and a second capability field, and generates the first identity. The first identity is related to the target capability list of the second electronic device.

For example, in some implementations, the processing unit 1303 is configured to: determine a protocol priority capability field, where the protocol priority capability field includes a projection level of the first projection protocol and a projection level of the second projection protocol; and determine the third capability field based on the first capability field, the second capability field, and the protocol priority capability field.

For example, in some implementations, the processing unit 1303 is configured to determine a first capability list and/or a second capability list, where the first capability list includes the first capability field, and the second capability list includes the second capability field. In addition, when a device identity in the first capability field is the same as a device identity in the second capability field, the processing unit 1303 is further configured to add the second capability field and the third capability field to the first capability list, to obtain the target capability list of the second electronic device; or when a device identity in the first capability field is the same as a device identity in the second capability field, the first electronic device adds the first capability field and the third priority capability field to the second capability list, to obtain the target capability list of the second electronic device.

For example, in some implementations, the obtaining unit 1302 is further configured to obtain a tapping instruction for the first identity. The processing unit 1303 is further configured to send projection indication information to the second electronic device in response to the tapping instruction. The projection indication information indicates the second electronic device to select to perform projection by using the first projection protocol and/or the second projection protocol.

Figure 14A:
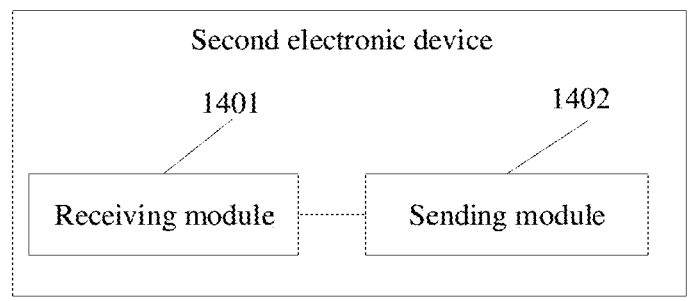
FIG. 14A is a schematic diagram of a structure of a second electronic device according to an embodiment of this application.

The foregoing mainly describes the first electronic device from the perspective of the functional module. The following describes the second electronic device from the perspective of the functional module. For example, when the functional units are obtained through division in an integrated manner, FIG. 14A is a schematic diagram of a structure of a second electronic device according to an embodiment of this application. As shown in FIG. 14A, an embodiment of the second electronic device in this application may include a receiving module 1401 and a sending module 1402.

The receiving module 1401 is configured to receive a first search request sent by a first electronic device. The first search request is used to search for an electronic device having a first projection receiving capability related to a first projection protocol and an electronic device having a second projection receiving capability related to a second projection protocol.

The sending module 1402 is configured to send a first feedback message to the first electronic device. The first feedback message is used to feed back that the second electronic device has the first projection receiving capability, and/or that the second electronic device has the second projection receiving capability.

Figure 14B:
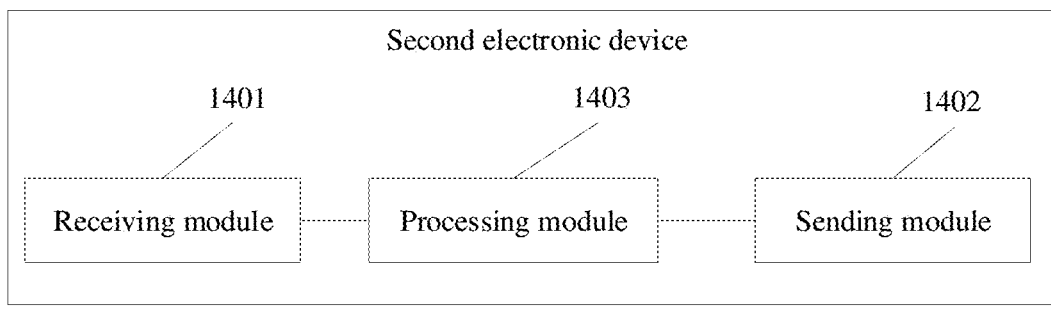
FIG. 14B is a schematic diagram of another structure of a second electronic device according to an embodiment of this application.

In some optional examples, based on the example in FIG. 14A, FIG. 14B is a schematic diagram of another structure of the second electronic device according to an embodiment of this application. As shown in FIG. 14B, the second electronic device further includes a processing module 1403.

The processing module 1403 is configured to: before the second electronic device sends the first feedback message to the first electronic device, extend a first type identity and a device identity in a first capability field, and extend a second type identity and a device identity in a second capability field. The first type identity and the second type identity identify a device type of the second electronic device.

For example, in some implementations, the receiving module 1401 is further configured to receive projection indication information sent by the first electronic device. The processing module 1403 is configured to select, based on the projection indication information, to perform projection by using the first projection protocol and/or the second projection protocol.

Figure 15:
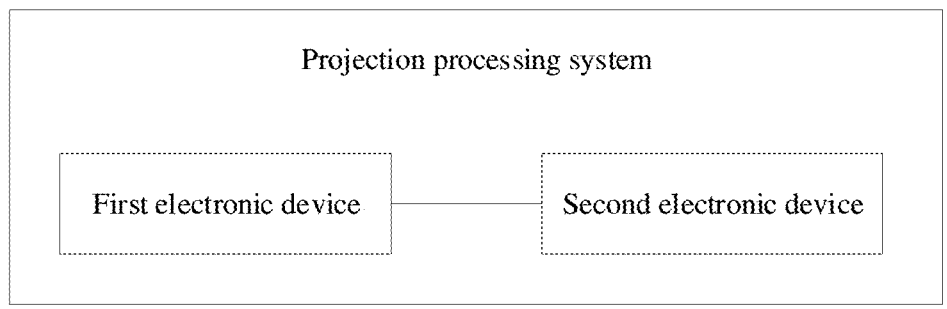
FIG. 15 is a schematic diagram of a structure of a projection processing system according to an embodiment of this application.

The foregoing mainly describes the first electronic device and the second electronic device in embodiments of this application from a perspective of a modular function. In this application, the first electronic device and the second electronic device may also be described from a perspective of system interaction. For example, FIG. 15 is a schematic diagram of a structure of a projection processing system. As shown in FIG. 15, the projection processing system in this application may include a first electronic device and a second electronic device. The first electronic device may be understood with reference to the first electronic device shown in either FIG. 11 or FIG. 13. The second electronic device may also be understood with reference to the second electronic device shown in FIG. 12 or FIG. 14A and FIG. 14B. Details are not described herein again.

The first electronic device and the second electronic device provided in this embodiment of this application are configured to perform the methods in the method embodiments corresponding to FIG. 3 to FIG. 10. Therefore, for this embodiment of this application, refer to related parts in the method embodiments corresponding to FIG. 3 to FIG. 10 for understanding.

In this embodiment of this application, the first electronic device and the second electronic device are presented in a form of functional units obtained through division in an integrated manner. The "functional unit" herein may be an application-specific integrated circuit (application-specific integrated circuit, ASIC), a processor and a memory that execute one or more software or firmware programs, an integrated logic circuit, and/or another device that can provide the foregoing functions. In a simple embodiment, a person skilled in the art may figure out that the first electronic device may be in a form shown in FIG. 11, and the second electronic device may be in a form shown in FIG. 12.

For example, the processor 110 in FIG. 11 may invoke the computer-executable instructions stored in the memory, to enable the first device to perform the method performed by the first electronic device in the method embodiments corresponding to FIG. 3 to FIG. 10.

The processor 1201 in FIG. 12 may invoke the computer-executable instructions stored in the memory 1202, to enable the second device to perform the method performed by the second electronic device in the method embodiments corresponding to FIG. 3 to FIG. 10.

In the device in FIG. 11 or FIG. 12 in this application, a communication connection is implemented between the components. To be specific, a processing unit (or the processor), a storage unit (or the memory), and a transceiver unit (the transceiver) communicate with each other through an internal connection path, to transfer a control signal and/or a data signal. The foregoing method embodiments of this application may be applied to the processor, or the steps in the foregoing method embodiments are implemented by the processor. The processor may be an integrated circuit chip, and has a signal processing capability. In an implementation process, steps in the foregoing method embodiments can be implemented by using a hardware integrated logical circuit in the processor, or by using instructions in a form of software. The processor may be a central processing unit (central processing unit, CPU), a network processor (network processor, NP), a combination of the CPU and the NP, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in this application. The general-purpose processor may be a microprocessor, or the processor may be any conventional processor, or the like. The steps in the methods disclosed with reference to this application may be directly performed and completed by a hardware decoding processor, or may be performed and completed by a combination of hardware and software modules in the decoding processor. The software module may be located in a mature storage medium in the art such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. Specifically, the processor may be a single-core (single-CPU) processor, or may be a multi-core (multi-CPU) processor.

The memory is configured to store computer instructions executed by the processor. The memory may be a storage circuit, or may be a memory. The memory may be a volatile memory or a nonvolatile memory, or may include both a volatile memory and a nonvolatile memory. The nonvolatile memory may be a read-only memory, a programmable read-only memory, an erasable programmable read-only memory, an electrically erasable programmable read-only memory, or a flash memory. The volatile memory may be a random access memory, and may serve as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver is configured to implement content interaction between the processor and another unit or network element. Specifically, the transceiver may be a communication interface of the apparatus, may be a transceiver circuit or a communication unit, or may be a transceiver. Alternatively, the transceiver may be a communication interface of the processor or a transceiver circuit. Optionally, the transceiver may be a transceiver chip. The transceiver may alternatively include a sending unit and/or a receiving unit. In a possible implementation, the transceiver may include at least one communication interface. In another possible implementation, the transceiver may alternatively be a unit implemented in a form of software. In embodiments of this application, the processor may interact with another unit or network element by using the transceiver. For example, the processor obtains or receives content from the another network element by using the transceiver. If the processor and the transceiver are two physically separated components, the processor may exchange content with the another unit of the apparatus without using the transceiver.

In a possible implementation, the processor, the memory, and the transceiver may be connected to each other through a bus. The bus may be a peripheral component interconnect (peripheral component interconnect, PCI) bus or an extended industry standard architecture (extended industry standard architecture, EISA) bus, or the like. The bus may be categorized as an address bus, a data bus, a control bus, or the like.

In embodiments of this application, the word such as "example", "for example", or the like is used to represent giving an example, an illustration, or a description. Any embodiment or design scheme described by using "example" or "for example" in embodiments of this application should not be explained as being more preferred or having more advantages than another embodiment or design scheme. To be precise, the word such as "example", "for example", or the like is intended to present a related concept in a specific manner.

In embodiments of this application, for ease of understanding, a plurality of examples are used for description. However, these examples are merely examples, but do not mean optimal implementations for implementing this application.

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, all or some procedures or functions according to embodiments of this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The technical solutions provided in this application are described in detail above. The principle and implementation of this application are described in this application by using specific examples. The description about embodiments is merely provided to help understand the method and core ideas of this application. In addition, a person of ordinary skill in the art can make modifications to this application in terms of the specific implementations and application scopes based on the ideas of this application. In conclusion, the content of this specification shall not be construed as a limitation to this application.

What is claimed is:

1. A first electronic device, wherein the first electronic device comprises:
    at least one processor;

at least one memory, wherein the memory is coupled to the at least one processor; and at least one computer program, wherein the at least one computer program is stored in the at least one memory, and when the at least one computer program is executed by the at least one processor, the first electronic device is enabled to:

automatically send a first search request and a second search request, wherein the first search request is used in a search for an electronic device having a first projection receiving capability, the first projection receiving capability is related to a first projection protocol, the second search request is used in a search for an electronic device having a second projection receiving capability, and the second projection receiving capability is related to a second projection protocol;

receive, from a second electronic device, a first feedback message or a second feedback message, wherein the first feedback message indicates whether the second electronic device has the first projection receiving capability, and the second feedback message indicates whether the second electronic device has the second projection receiving capability; and automatically display a first identity related to the second electronic device, in response to the first feedback message or the second feedback message, wherein:

when the first feedback message and the second feedback message are used to feed back that the second electronic device has the first projection receiving capability and the second projection receiving capability, the first identity comprises a device identity of the second electronic device, a first control that triggers projection to the second electronic device by using the first projection protocol, and a second control that triggers projection to the second electronic device by using the second projection protocol, and the device identity, the first control, and the second control are displayed in a same row or a same column;

when the first feedback message is used to feed back that the second electronic device has the first projection receiving capability, the first identity comprises the device identity of the second electronic device and the first control that triggers projection to the second electronic device by using the first projection protocol, and the device identity and the first control are displayed in the same row or the same column; or when the second feedback message is used to feed back that the second electronic device has the second projection receiving capability, the first identity comprises the device identity of the second electronic device and the second control that triggers projection to the second electronic device by using the second projection protocol, and the device identity and the second control are displayed in the same row or the same column.

2. The first electronic device according to claim 1, wherein when the first feedback message is used to feed back that the second electronic device has the first projection receiving capability, the first identity comprises the device identity of the second electronic device and the first control that triggers projection to the second electronic device by using the first projection protocol, and the device identity and the first control are displayed in the same row or the same column, comprises:

when the first feedback message is used to feed back that the second electronic device has the first projection receiving capability and the second feedback message is used to feed back that the second electronic device does not have the second projection receiving capability, the first identity comprises the device identity of the second electronic device and the first control that triggers projection to the second electronic device by using the first projection protocol, and the device identity and the first control are displayed in the same row or the same column.

3. The first electronic device according to claim 2, wherein when the second feedback message is used to feed back that the second electronic device has the second projection receiving capability, the first identity comprises the device identity of the second electronic device and the second control used to trigger projection to the second electronic device by using the second projection protocol, and the device identity and the second control are displayed in the same row or the same column, comprises:

when the first feedback message is used to feed back that the second electronic device does not have the first projection receiving capability and the second feedback message is used to feed back that the second electronic device has the second projection receiving capability, the first identity comprises the device identity of the second electronic device and the second control that triggers projection to the second electronic device by using the second projection protocol, and the device identity and the second control are displayed in the same row or the same column.

4. The first electronic device according to claim 3, wherein when the first feedback message is used to feed back that the second electronic device does not have the first projection receiving capability, and the second feedback message is used to feed back that the second electronic device does not have the second projection receiving capability, the first identity comprises the device identity of the second electronic device.

5. The first electronic device according to claim 1, wherein to receive the first feedback message or the second feedback message from the second electronic device, the first electronic device is enabled to:

receive, within a preset duration, the first feedback message or the second feedback message from the second electronic device.

6. The first electronic device according to claim 1, wherein the first feedback message comprises a first capability field used by the second electronic device to support projection by using the first projection protocol, and the second feedback message comprises a second capability field used by the second electronic device to project using the second projection protocol.

7. The first electronic device according to claim 6, wherein the first capability field comprises a first type identity and the device identity, the second capability field comprises a second type identity and the device identity, and the first type identity and the second type identity identify a device type of the second electronic device.

8. The first electronic device according to claim 7, wherein, before the automatically displaying the first identity related to the second electronic device, the first electronic device is enabled to:

determine a third capability field after the second electronic device is determined as an integrated projection device based on the first type identity or the second type identity, wherein the third capability field indicates that the second electronic device supports projection by using the first projection protocol and the second projection protocol;
determine a target capability list of the second electronic device based on the third capability field, the first capability field, and the second capability field; and
generate the first identity, wherein the first identity is related to the target capability list of the second electronic device.

9. The first electronic device according to claim 8, wherein to determine the third capability field, the first electronic device is enabled to:
determine a protocol priority capability field, wherein the protocol priority capability field comprises a first projection level of the first projection protocol and a second projection level of the second projection protocol; and
determine the third capability field based on the first capability field, the second capability field, and the protocol priority capability field.

10. The first electronic device according to claim 9, wherein to determine the target capability list of the second electronic device based on the third capability field, the first capability field, and the second capability field, the first electronic device is enabled to:
determine a first capability list or a second capability list, wherein the first capability list comprises the first capability field, and the second capability list comprises the second capability field; and
in response to the device identity in the first capability field being the same as the device identity in the second capability field, add the second capability field and the third capability field to the first capability list, to obtain the target capability list of the second electronic device; or
in response to the device identity in the first capability field being the same as the device identity in the second capability field, add the first capability field and the third capability field to the second capability list, to obtain the target capability list of the second electronic device.

11. The first electronic device according to claim 1, wherein the first projection protocol comprises a mirror projection miracast protocol or a digital living alliance (DLNA) protocol, and wherein the second projection protocol comprises the mirror projection miracast protocol or the DLNA protocol.

12. A method comprising:
automatically sending a first search request and a second search request, wherein the first search request is used in a search for an electronic device having a first projection receiving capability, the first projection receiving capability is related to a first projection protocol, the second search request is used in a search for an electronic device having a second projection receiving capability, and the second projection receiving capability isrelated to a second projection protocol;
receiving a first feedback message or a second feedback message from a second electronic device, wherein the first feedback message is used to feed back that the second electronic device has the first projection receiving capability or the second feedback message is used to feed back that the second electronic device has the second projection receiving capability; and
automatically displaying a first identity related to the second electronic device, in response to the first feedback message or the second feedback message, wherein when the first feedback message and the second feedback message are used to feed back that the second electronic device has the first projection receiving capability and the second projection receiving capability, the first identity comprises a device identity of the second electronic device, a first control that triggers projection to the second electronic device by using the first projection protocol, and a second control that triggers projection to the second electronic device by using the second projection protocol, and the device identity, the first control, and the second control are displayed in a same row or a same column;
when the first feedback message is used to feed back that the second electronic device has the first projection receiving capability, the first identity comprises the device identity of the second electronic device and the first control that triggers projection to the second electronic device by using the first projection protocol, and the device identity and the first control are displayed in the same row or the same column; or
when the second feedback message is used to feed back that the second electronic device has the second projection receiving capability, the first identity comprises the device identity of the second electronic device and the second control that triggers projection to the second electronic device by using the second projection protocol, and the device identity and the second control are displayed in the same row or the same column.

13. The method according to claim 12, wherein when the first feedback message is used to feed back that the second electronic device has the first projection receiving capability, the first identity comprises the device identity of the second electronic device and the first control that triggers projection to the second electronic device by using the first projection protocol, and the device identity and the first control are displayed in the same row or the same column comprises:
when the first feedback message is used to feed back that the second electronic device has the first projection receiving capability, and the second feedback message is used to feed back that the second electronic device does not have the second projection receiving capability, the first identity comprises the device identity of the second electronic device, and the first control that triggers projection to the second electronic device by using the first projection protocol, and the device identity and the first control are displayed in the same row or the same column.

14. The method according to claim 13, wherein when the second feedback message is used to feed back that the second electronic device has the second projection receiving capability, the first identity comprises the device identity of the second electronic device and the second control used to trigger projection to the second electronic device by using the second projection protocol, and the device identity and the second control are displayed in the same row or the same column comprises:
when the first feedback message is used to feed back that the second electronic device does not have the first projection receiving capability, and the second feedback message is used to feed back that the second electronic device has the second projection receiving capability, the first identity comprises the device identity of the second electronic device, and the second control that triggers projection to the second electronic device by using the second projection protocol, and the device identity and the second control are displayed in the same row or the same column.

15. The method according to claim 12, wherein when the first feedback message is used to feed back that the second electronic device does not have the first projection receiving capability, and the second feedback message is used to feed back that the second electronic device does not have the second projection receiving capability, the first identity comprises the device identity of the second electronic device.

16. The method according to claim 12, wherein the first feedback message includes a first capability field used by the second electronic device to support projection by using the first projection protocol, and the second feedback message includes a second capability field used by the second electronic device to support projection by using the second projection protocol.

17. A non-transitory computer-readable storage medium, comprising at least one computer program, wherein the at least one computer program is configured to, upon execution on a first electronic device, enable the first electronic device to perform:

automatically sending a first search request and a second search request, wherein the first search request is used in a search for an electronic device having a first projection receiving capability related to a first projection protocol, and the second search request is used in a search for an electronic device having a second projection receiving capability related to a second projection protocol;

receiving a first feedback message or a second feedback message from a second electronic device, wherein the first feedback message is used to feed back that the second electronic device has the first projection receiving capability, or the second feedback message is used to feed back that the second electronic device has the second projection receiving capability; and automatically displaying a first identity related to the second electronic device, in response to the first feedback message or the second feedback message, wherein when the first feedback message and the second feedback message are used to feed back that the second electronic device has the first projection receiving capability and the second projection receiving capability, the first identity comprises a device identity of the second electronic device, a first control that triggers projection to the second electronic device by using the first projection protocol, and a second control that triggers projection to the second electronic device by using the second projection protocol, and the device identity, and the first control, and the second control are displayed in a same row or a same column;

when the first feedback message is used to feed back that the second electronic device has the first projection receiving capability, the first identity comprises the device identity of the second electronic device and the first control that triggers projection to the second electronic device by using the first projection protocol, and the device identity and the first control are displayed in the same row or the same column; or when the second feedback message is used to feed back that the second electronic device has the second projection receiving capability, the first identity comprises: the device identity of the second electronic device, and the second control that triggers projection to the second electronic device by using the second projection protocol, and the device identity and the second control are displayed in the same row or the same column.

18. The non-transitory computer-readable storage medium according to claim 17, wherein when the first feedback message is used to feed back that the second electronic device has the first projection receiving capability, the first identity comprises the device identity of the second electronic device and the first control that triggers projection to the second electronic device by using the first projection protocol, and the device identity and the first control are displayed in the same row or the same column comprises:

when the first feedback message is used to feed back that the second electronic device has the first projection receiving capability, and the second feedback message is used to feed back that the second electronic device does not have the second projection receiving capability, the first identity comprises: the device identity of the second electronic device, and the first control used to trigger projection to the second electronic device by using the first projection protocol, and the device identity and the first control are displayed in the same row or the same column.

19. The non-transitory computer-readable storage medium according to claim 18, wherein when the second feedback message is used to feed back that the second electronic device has the second projection receiving capability, the first identity comprises the device identity of the second electronic device and the second control used to trigger projection to the second electronic device by using the second projection protocol, and the device identity and the second control are displayed in the same row or the same column comprises:

when the first feedback message is used to feed back that the second electronic device does not have the first projection receiving capability, and the second feedback message is used to feed back that the second electronic device has the second projection receiving capability, the first identity comprises the device identity of the second electronic device and the second control that triggers projection to the second electronic device by using the second projection protocol, and the device identity and the second control are displayed in the same row or the same column.

20. The non-transitory computer-readable storage medium according to claim 17, wherein when the first feedback message is used to feed back that the second electronic device does not have the first projection receiving capability and the second feedback message is used to feed back that the second electronic device does not have the second projection receiving capability, the first identity comprises: the device identity of the second electronic device.

* * * * *

UNITED STATES PATENT AND TRADEMARK OFFICE
CERTIFICATE OF CORRECTION

PATENT NO. : 12,367,007 B2  
APPLICATION NO. : 18/686308  
DATED : July 22, 2025  
INVENTOR(S) : Wu et al.

Page 1 of 1

It is certified that error appears in the above-identified patent and that said Letters Patent is hereby corrected as shown below:

In the Claims

In Column 59, in Claim 12, Line 57, delete "isrelated" and insert -- is related --.

Signed and Sealed this  
Second Day of September, 2025

Coke Morgan Stewart  
*Acting Director of the United States Patent and Trademark Office*